United States Patent
Jacob

(10) Patent No.: US 9,888,755 B2
(45) Date of Patent: Feb. 13, 2018

(54) LUGGAGE

(71) Applicant: Matte-Veede FZE, Fujairah (AE)

(72) Inventor: Jonathan Jacob, Dubai (AE)

(73) Assignee: Matte-Veede FZE, Fujairah (AE)

( * ) Notice: Subject to any disclaimer, the term of this patent is extended or adjusted under 35 U.S.C. 154(b) by 46 days.

(21) Appl. No.: 14/986,731

(22) Filed: Jan. 4, 2016

(65) Prior Publication Data
US 2017/0188679 A1     Jul. 6, 2017

(51) Int. Cl.
| | | |
|---|---|---|
| *A45C 13/10* | (2006.01) | |
| *A45C 5/03* | (2006.01) | |
| *A45C 5/14* | (2006.01) | |
| *A45C 13/18* | (2006.01) | |
| *A45C 13/26* | (2006.01) | |
| *A45C 15/00* | (2006.01) | |
| *A45C 15/06* | (2006.01) | |
| *G01G 19/52* | (2006.01) | |
| *H04W 76/02* | (2009.01) | |

(52) U.S. Cl.
CPC ............... *A45C 13/10* (2013.01); *A45C 5/03* (2013.01); *A45C 5/146* (2013.01); *A45C 13/18* (2013.01); *A45C 13/262* (2013.01); *A45C 15/00* (2013.01); *A45C 15/06* (2013.01); *G01G 19/52* (2013.01); *H04W 76/02* (2013.01); *A45C 2005/037* (2013.01); *A45C 2013/267* (2013.01)

(58) Field of Classification Search
CPC ........... E05B 65/52; A45C 13/18; A45C 5/03; G07C 2209/62; G07C 9/00912; G08B 21/24; G06K 19/07758; G06Q 50/28
See application file for complete search history.

(56) References Cited

U.S. PATENT DOCUMENTS

| 4,081,061 A | 3/1978 | Tucker | |
|---|---|---|---|
| 9,154,486 B1 * | 10/2015 | Saylor | E05B 65/52 |

(Continued)

FOREIGN PATENT DOCUMENTS

| JP | 2006-112083 A | 4/2006 |
|---|---|---|
| WO | 2014-166665 A1 | 10/2014 |

OTHER PUBLICATIONS

Feb. 28, 2007—(WO) International Search Report and Written Opinion—App PCT/IB2017/050010.

(Continued)

*Primary Examiner* — Mirza Alam
(74) *Attorney, Agent, or Firm* — Banner & Witcoff, Ltd.

(57) ABSTRACT

Luggage as well as systems, devices, methodologies, and software for use with such luggage are disclosed. The luggage may include one or more compartments and lids that can be locked. The luggage may also include an identification device for obtaining information identifying a user and a computing device, such as a microcontroller or processor. The computing device may be configured to compare identification information with reference identification information to determine whether a user is authorized to access an interior of the luggage. Based on results of the comparison, the computing device may control a locking mechanism to unlock one or more of lids of the luggage to allow a user access to the interior of the luggage. The luggage may also include a GPS transceiver for tracking the luggage, a sensor for weighing the luggage, or a coupling mechanism to couple the luggage to another piece of luggage.

17 Claims, 24 Drawing Sheets

(56) References Cited

U.S. PATENT DOCUMENTS

| | | | |
|---|---|---|---|
| 9,177,186 B1* | 11/2015 | Rinehart | G06K 19/07758 |
| 2007/0240198 A1* | 10/2007 | Kander | G07C 9/00103 |
| | | | 726/2 |
| 2009/0226050 A1 | 9/2009 | Hughes | |
| 2011/0186397 A1* | 8/2011 | Sheikh | A45C 13/00 |
| | | | 190/120 |
| 2013/0240314 A1* | 9/2013 | Pitchforth | A45C 5/14 |
| | | | 190/18 A |
| 2014/0151173 A1 | 6/2014 | Reh et al. | |
| 2014/0166743 A1* | 6/2014 | Hanson | G06Q 20/1085 |
| | | | 235/379 |
| 2015/0114777 A1 | 4/2015 | Edme et al. | |
| 2016/0164904 A1* | 6/2016 | Alamuri | H04L 63/1433 |
| | | | 726/25 |
| 2016/0235236 A1* | 8/2016 | Byers | A47G 29/14 |

OTHER PUBLICATIONS

Emmino, Nicolette "This Space-Age Suitcase Boasts GPS, Biometric Locks, and a Built-In Power Bank" https://web.archive.org/web/20150710031726/http://www.digitaltrends.com/cool-tech/cool-techhigh-tech-features-space-case-suitcase pp. 1-4, Jul. 7, 2015.

Rimowa "A Riveting Company" https://www.rimowa.com/en-us/ company site visited Apr. 14, 2017, 2 pages.

\* cited by examiner

LUGGAGE

FIELD OF ART

Aspects of the disclosure generally relate to luggage, such as aircraft cabin luggage and other suitcases. More particularly, aspects of this disclosure relate to luggage equipped with technology to provide improved security and handling and to assist users with various tasks during travel.

BACKGROUND

Luggage is used by people to carry a variety of items, such as clothes, shoes, jewelry, gifts, computing devices (e.g., laptops, tablets, etc.), money, documents (e.g., contracts, business records, bank statements, etc.) when they travel. Generally, luggage includes at least one compartment for holding items and a handle or strap that helps a user to carry, hold, or move the luggage. In some cases, luggage may include wheels to make moving the luggage easier. Many pieces of luggage include a zipper for opening and closing the compartment. Different pieces of luggage may be designed for different purposes. For example, some pieces of luggage may be designed to be carried onto the cabin of an aircraft (e.g., plane) and stored in an overhead bin (or overhead compartment) or underneath a seat on the plane. These pieces of luggage may be referred to as "carry-on luggage." Other pieces of luggage may be designed for placement in the hold or cargo section of an aircraft. Different airlines may have different restrictions on the size and weight of luggage. For example, an airline may require that luggage be within a certain length, width, and height in order to be carried onto an aircraft cabin. Further, restrictions on what luggage may be used may depend on the type of aircraft. Smaller aircraft may have tighter restrictions on the size and weight of luggage. For example, the size and weight restrictions of carry-on luggage may be tied to the dimensions of an overhead bin.

Travelling may be stressful for many people. Some people may worry about meeting the restrictions of the airline(s) they are using as well as complying with the various laws and rules of security agencies (e.g., Transportation Security Administration (TSA)) and countries through which they are travelling. In addition, some people may be concerned that their luggage may be lost or stolen. Some people may also be concerned that others (e.g., baggage carriers, airline employees, other passengers, security officials (e.g., Transportation Security Administration (TSA) workers, etc.) may tamper with their luggage. For example, some travelers worry that others might access their luggage and remove items from the luggage without their permission (e.g., steal their items from their luggage). Travelers may especially have these concerns when travelling with valuable items or to places they have not been or places notorious for crime.

Accordingly, new luggage as well as new systems, devices, methodologies, and software for use with luggage may be desired.

BRIEF SUMMARY

In light of the foregoing background, the following presents a simplified summary of the present disclosure in order to provide a basic understanding of some aspects of the invention. This summary is not an extensive overview of the disclosure. It is not intended to identify key or critical elements of the inventions or to delineate the scope of the inventions. The following summary merely presents some concepts of the disclosure in a simplified form as a prelude to the more detailed description provided below.

Aspects of the disclosure address one or more of the issues mentioned above by disclosing next-generation luggage as well as systems, devices, methodologies, and software for use with such luggage. An interior of the luggage may include one or more compartments. The luggage may also include one or more lids that can open or close. The lids can be locked or unlocked to secure the contents of the luggage. The luggage may also include an identification device for obtaining information identifying a user (e.g., identification information) and a computing device (e.g., a microcontroller or processor). The computing device may be configured to compare identification information with reference identification information to determine whether a user is authorized to access an interior of the luggage. Based on results of the comparison, the computing device may control a locking mechanism to unlock one or more of lids of the luggage to allow a user access to the interior of the luggage. For example, the computing device may send a signal to release a lock. Once the lock is released, the lid(s) of the luggage may be opened. When the lid(s) are opened, lights may be turned on inside the luggage. The luggage may also include various other components, such as a GPS transceiver for tracking the luggage, a sensor for weighing the luggage, or a coupling mechanism to couple the luggage to another piece of luggage.

Aspects of this disclosure provide luggage, including a body portion comprising a compartment for holding one or more items and a lid for enclosing the compartment when the lid is in a closed position; an identification device (e.g., iris scanner, retinal scanner, fingerprint reader, etc.) configured to obtain biometric information of a user; and a computing device. The computing device may be configured (e.g., programmed or wired) to: compare the biometric information with reference identification information to determine whether the user is authorized to access the compartment; and electronically unlock the lid in response to a determination that the user is authorized to access the compartment.

The luggage may further include memory storing the reference identification information. The computing device may be further configured to control the identification device to obtain the reference identification information prior to locking the lid; and store the reference identification information in the memory. Additionally, or alternatively, the computing device may be further configured to control the identification device to obtain the reference identification information prior to locking the lid; and transmit, via a network (e.g., Internet, cellular backhaul, satellite network, etc.), the reference identification information for storage in a memory that is remote from the luggage (e.g., memory in the "cloud").

The computing device may be further configured to electronically control a locking mechanism to lock the lid in the closed position. Further, the computing device may be configured to control the identification device to obtain the reference identification information. In response to obtaining the reference identification information and in response to determining that the lid is moved to the closed position, the computing device may control a locking mechanism to lock the lid in the closed position.

The luggage may further include a proximity sensor configured to detect when the lid is moved to the closed position. The computing device may receive information from the proximity sensor indicating that the lid is moved to the closed position. Also, the luggage may include a display device configured to output a screen generated by the computing device. The computing device may also be configured to control the display device to display a notification (e.g., message, blinking lights, etc.). The notification may indicate that the lid is locked after controlling a locking mechanism to lock the lid in the closed position.

In some embodiments, the luggage may include a wireless communication interface configured to wirelessly transmit or receive information with a mobile device (e.g., mobile/cellular phone, satellite phone, tablet, PDA, etc.). The computing device may also be further configured to establish a communication session (e.g., Bluetooth session, NFC session, WiFi Direct session, etc.) with the mobile device via the wireless communication interface when the mobile device is within a radio wave range of the luggage, and transmit, to the mobile device during the communication session, a notification (e.g., a message). The notification may indicate that the lid is locked after controlling a locking mechanism to lock the lid in the closed position.

Moreover, in some embodiments, the luggage may include a temperature sensor configured to determine an ambient temperature associated with the luggage; a global positioning system transceiver configured to receive and transmit satellite communications for determining a location of the luggage; a weight sensor configured to determine a weight of the luggage including any items within the compartment; and a light configured to turn on when the lid is opened.

Additionally, the luggage may include a coupling mechanism configured to couple the luggage to a second luggage. The coupling mechanism may include at least one arm that rotates from a first position in which an end of the arm contacts a portion of the body of the luggage to a second position in which the end of the arm engages (e.g., snaps or clasps to) a recessed portion of the second luggage. The computing device may be further configured to determine whether the second luggage is coupled to the luggage based on data received from a sensor and/or determine whether the coupling mechanism is locked such that the second luggage is locked to the luggage. In some examples, the computing device may be further configured to electronically control a lock to lock the coupling mechanism, and/or electronically control the lock to unlock the coupling mechanism in response to a determination that the user is authorized to detach the second luggage from the luggage.

Aspects of the disclosure also provide a suitcase, including a shell forming a compartment for holding one or more items and a lid configured to move between an open position and a closed position. The lid may expose the compartment to a user outside of the shell when the lid is in the open position. The suitcase may also include an identification device configured to collect biometric information of a first user, memory storing reference identification information associated with a second user, and a computing device. The computing device may be configured to compare the biometric information with the reference identification information to determine whether the first user matches the second user, and electronically unlock the lid in response to determining that the first user matches the second user.

The suitcase may further include one or more wheels (e.g., 360 degree wheels, in-line wheels, etc.), a stem (or neck) configured to extend (or telescope) out of the shell of the suitcase, and a handle connected to an end of the stem. The handle may be configured to move between an "in" position within the shell and an "out" position outside of the shell. The suitcase may also include a cable connected to the stem and configured to deploy the one or more wheels when the handle is moved out of the "in" position and to retract the one or more wheels (e.g., stow the wheels in one or more wheel wells) when the handle is moved into the "in" position. The computing device may be further configured to determine a weight of the suitcase in response to deployment of the one or more wheels. Additionally, the suitcase may include a kickstand that is deployed and retracted along with the one or more wheels. The kickstand may be configured to balance the suitcase in an upright position (where the top portion is up) when the one or more wheels are deployed.

Aspects of the disclosure further provide luggage including a body portion including a compartment for holding one or more items and a lid (or cover) for enclosing the compartment when the lid is in a closed position; an identification device configured to obtain identification information from a user; a locking mechanism configured to lock the lid in the closed position; and a computing device. The computing device may be configured to electronically control the locking mechanism to lock the lid in the closed position in response to obtaining first identification information from a first user; electronically control the identification device to obtain second identification information from a second user; compare the second identification information with the first identification information to determine whether the first identification information matches (e.g., exactly matches or matches within a margin of error) the second identification information; and electronically control the locking mechanism to unlock the lid in response to a determination that the first identification information matches the second identification information.

The luggage may also include a first coupler on a right side of the luggage configured to connect to a left side of a second luggage; a second coupler on a left side of the luggage configured to connect to a right side of the second luggage; and one or more protrusions on a rear side of the luggage configured to engage (e.g., contact or connect with) one or more respective holes (e.g., divots) on a rear side of the second luggage. In addition, the luggage may include a second locking mechanism configured to lock at least one of the first coupler or the second coupler when the luggage is coupled to the second luggage. The computing device may be further configured to electronically control the second locking mechanism to lock the at least one of the first coupler or the second coupler in response to obtaining the first identification information from the first user. The computing device may also be configured to determine whether the second luggage becomes uncoupled (e.g., detached) from the luggage; and in response to a determination that the second luggage becomes uncoupled from the luggage, transmit a notification (e.g., a message). The notification may indicate that the second luggage has been uncoupled from the luggage and may be transmitted to a mobile device associated with the first user so that the first user may be alerted to the uncoupling.

Of course, the above-referenced embodiments may also include other additional elements, steps, computer-executable instructions, or computer-readable data structures. In this regard, other embodiments are disclosed and claimed herein as well. The details of these and other embodiments of the present disclosure are set forth in the accompanying drawings and the description below. Other features and advantages of the inventions will be apparent from the description, drawings, and claims.

BRIEF DESCRIPTION OF THE DRAWINGS

The present inventions are illustrated by way of example and are not limited by the accompanying figures in which like reference numerals indicate similar elements and in which.

DETAILED DESCRIPTION

In accordance with various aspects of the disclosure, luggage or suitcases and other apparatuses are disclosed. The luggage (e.g., a suitcase) may be equipped with a microcomputer, integrated circuit (IC), or other computing device. The luggage may also include a display device (e.g., LCD screen) and various sensors for providing various information to a user of the luggage. For example, a temperature, weight, or location of the luggage may be detected by sensors on or in the luggage. The luggage may also be equipped with an identification device to ensure that only certain individuals are permitted to open the luggage. The lids of the luggage may be locked to keep the contents on the luggage secure. The locks may be on the inside of the luggage to prevent others from tampering with the locks. Only when a certain user is identified, will the locks be unlocked to allow the lids to open. With these security features, the luggage may effectively function as a portable safe for traveling.

While luggage may have been developed for practical reasons and many buyers may purchase luggage based on its practicality, some users may select luggage based on its looks. Like handbags and other personal items, luggage may be a fashion item. Sometimes fashion conflicts with function. For example, some buyers may desire a sleek look to luggage which may be difficult to achieve given that luggage often has a handle and wheels to facilitate travel with the luggage.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1A:
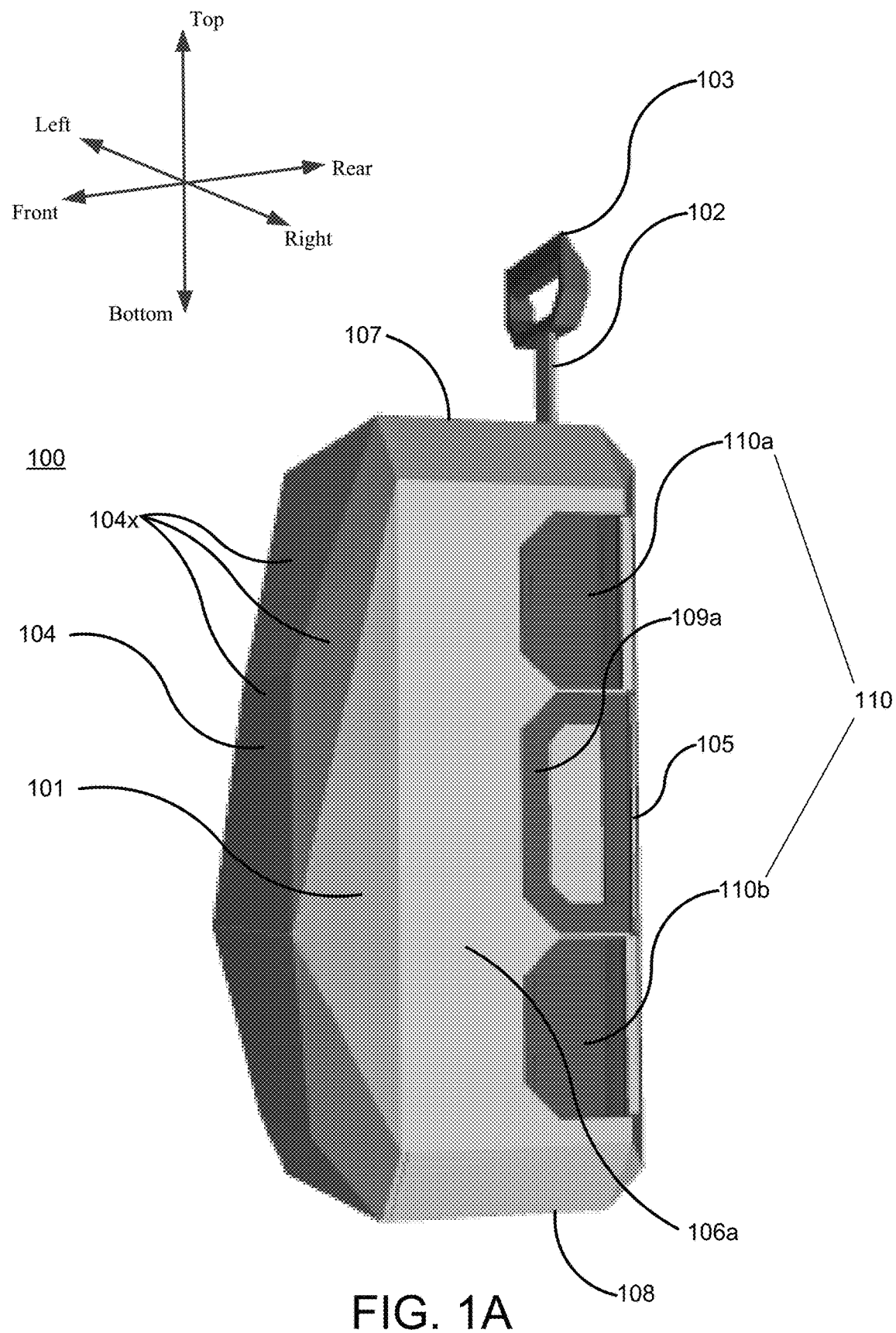
FIGS. 1A and 1B are diagrams illustrating aspects of an example embodiment of luggage.

FIG. 1A illustrates a front perspective view of an example piece of luggage (or suitcase) 100. The luggage 100 may include a body (or shell) 101 in which items, such as personal belongings, may be stored during travel. The luggage may also include a stem 102 connecting the body 101 to a top handle 103 that may be used by a person to move (e.g., push or pull) the luggage 100. In FIG. 1A, the stem 102 is extended and the top handle 103 is in an "out" position. As described herein, the top handle 103 may be moved from an "in" position, in which the top handle 103 is fitted into the luggage and the stem 102 is collapsed into the body 101 of the luggage, and the "out" position, in which the top handle 103 is away from the body 101 and the stem is extended out of the body 101.

The body 101 of the luggage 100 may be approximately 55.5 cm in length (e.g., distance from top to bottom) and 35.5 cm in width (e.g., distance from left to right). Also, in some examples, the height (e.g., distance from rear to front) of the body 101 of the luggage 100 may be in a range of approximately 18 cm to 24.5 cm. The body 101 of the luggage may include a front portion 104, a rear portion 105, two side portions (right side portion 106a and left side portion 106b (not shown in FIG. 1A)), a top portion 107, and a bottom portion 108. In some embodiments, each of these portions may be made of the same material. In other embodiments, different materials may be used for different portions. For example, the front portion 104 may be made from a different material than the right side portion 106a and left side portion 106b. Examples of materials used for the body 101 include plastic (e.g., a hard plastic), carbon fiber, Kevlar, leather, metal (e.g., aluminum, titanium), etc.

As shown in FIG. 1A, the front portion 104 may include one or more front facets 104x. The front facets 104x may be surfaces of different polygonal shapes having different sizes (e.g., areas). The number of front facets forming the front portion 104 may vary in different embodiments. Moreover, in some embodiments, the front portion 104 might not have any facets. For example, the front portion 104 may have an oval (or rounded) shape or may be a relatively flat surface.

The right side portion 106a may include a right side handle 109a. Likewise, the left side portion 106b may include a left side handle 109b. In FIG. 1A, the right side handle 109a is shown in the closed position. When in the closed position as shown, the right side handle 109a may fit into a recess on the right side portion 106a so that luggage 100 may sit flat when placed on its side. The right side handle 109a may flip up, or rotate, so that a user may get her hand around the handle. In some embodiments, side handles may be on both sides of the luggage 100. In other embodiments, only one of the left and right side portions 106a and 106b may have a side handle. In still other embodiments, neither the right side portion 106a nor the left side portion 106b may have a side handle.

In FIG. 1A, the right side handle 109a is shown as being centered in the vertical (e.g., top-bottom) direction. This location may help in providing balance when carrying the luggage 100 using the right side handle 109a. The left side handle 109b may be in a similar position on the left side portion 106b as the right side handle 109a is on the right side portion 106a or may be in a different position to give the user options for carrying the luggage 100.

As shown in FIG. 1A, the luggage 100 may also include a coupling mechanism 110. In the example of FIG. 1A, the coupling mechanism includes two couplers 110a and 110b on the right side portion 106a. Although not shown in FIG. 1A, the left side portion 106b may also include two other couplers 111a and 111b forming another coupling mechanism 111. As described further herein, the coupling mechanisms 110 and 111 allow the luggage 100 to be coupled to another piece of luggage.

The two couplers 110a and 110b may be spaced apart to improve the coupling strength (i.e., the strength with which the luggage 100 is coupled to another piece of luggage). The couplers may have different shapes than the ones shown. For example, in other embodiments, the couplers may appear as semicircles or rectangles. Also, although the couplers 110a and 110b have the same shape in FIG. 1A, couplers on the same side may have different shapes. For example, coupler 110a may be rectangular, while coupler 110b may be a semicircle. Also, while two couplers 110a and 110b are shown in FIG. 1A, in other embodiments, only one coupler may be used as the coupling mechanism 110. Alternatively, three or more couplers may be placed on a side portion of the luggage 100.

Further, in FIG. 1A, the two couplers 110a and 110b are shown in an unlocked position. When in the unlocked position as shown, the two couplers 110a and 110b may fit into respective recesses on the right side portion 106a so that luggage 100 may sit flat when placed on its side.

Figure 1B:
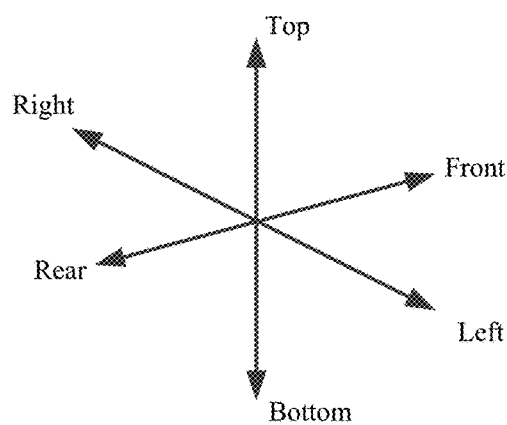
Figure 1B:
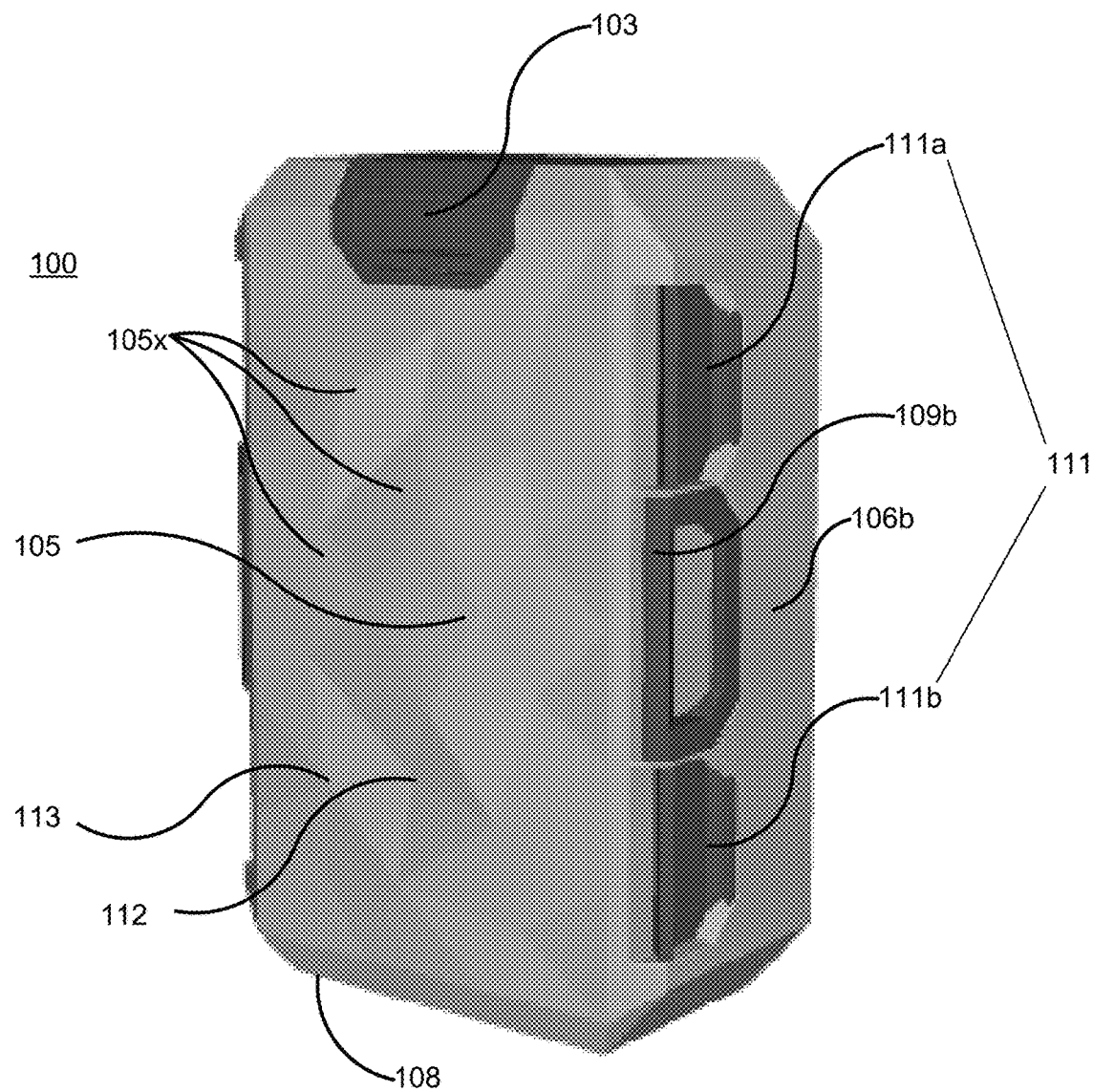

FIG. 1B illustrates a rear perspective view of the luggage 100. From this view, rear facets 105x forming the rear portion 105 are visible. The rear facets 105x may be polygonal surfaces of various sizes and shapes. The rear facets 105x may be set at various angles to form divots (or holes) 112 and protrusions (or projections) 113. The number of rear facets 105x may vary in different embodiments. For example, larger pieces of luggage may have more rear facets 105x. As the number of rear facets 105x may vary, the number of divots 112 and protrusions 113 may also vary.

In some embodiments, the depth of the divots 112 may be approximately 1 cm or approximately 6 mm. Also, in some embodiments, the depth of the divots (or holes) 112 may vary. For example, the depths of the divots may be in a range of 0.1 cm to 2 cm. As explained further herein, these divots 112 may facilitate coupling of the luggage 100 to another piece of luggage so that two pieces of luggage may be moved together fluidly/smoothly.

In some embodiments (not shown), the rear portion 105 might have rear bumps instead of rear facets 105x. In such embodiments, the rear bumps may be convex portions having a rounded or dome shape. The rear bumps may also create divots or valleys. In addition, or alternatively, the rear portion 105 might have concave portions having a rounded or dome shape so that the concave portions form impressions or indentations on the luggage 100. In other embodiments, the rear portion 105 might have rear pyramids having a pyramidal shape that create divots or valleys. Still, in other embodiments, the rear portion 105 might have rear blocks, which may look like blocks that protrude from the rear portion to form divots or valleys therebetween.

FIG. 1B also shows the top handle 103 in an "in" position. As shown from this view, the top handle 103 may slide into the rear portion 105 of the luggage so that the luggage 100 may lay flat when resting on its rear portion 105 or resting on its top portion 107.

Figure 2:
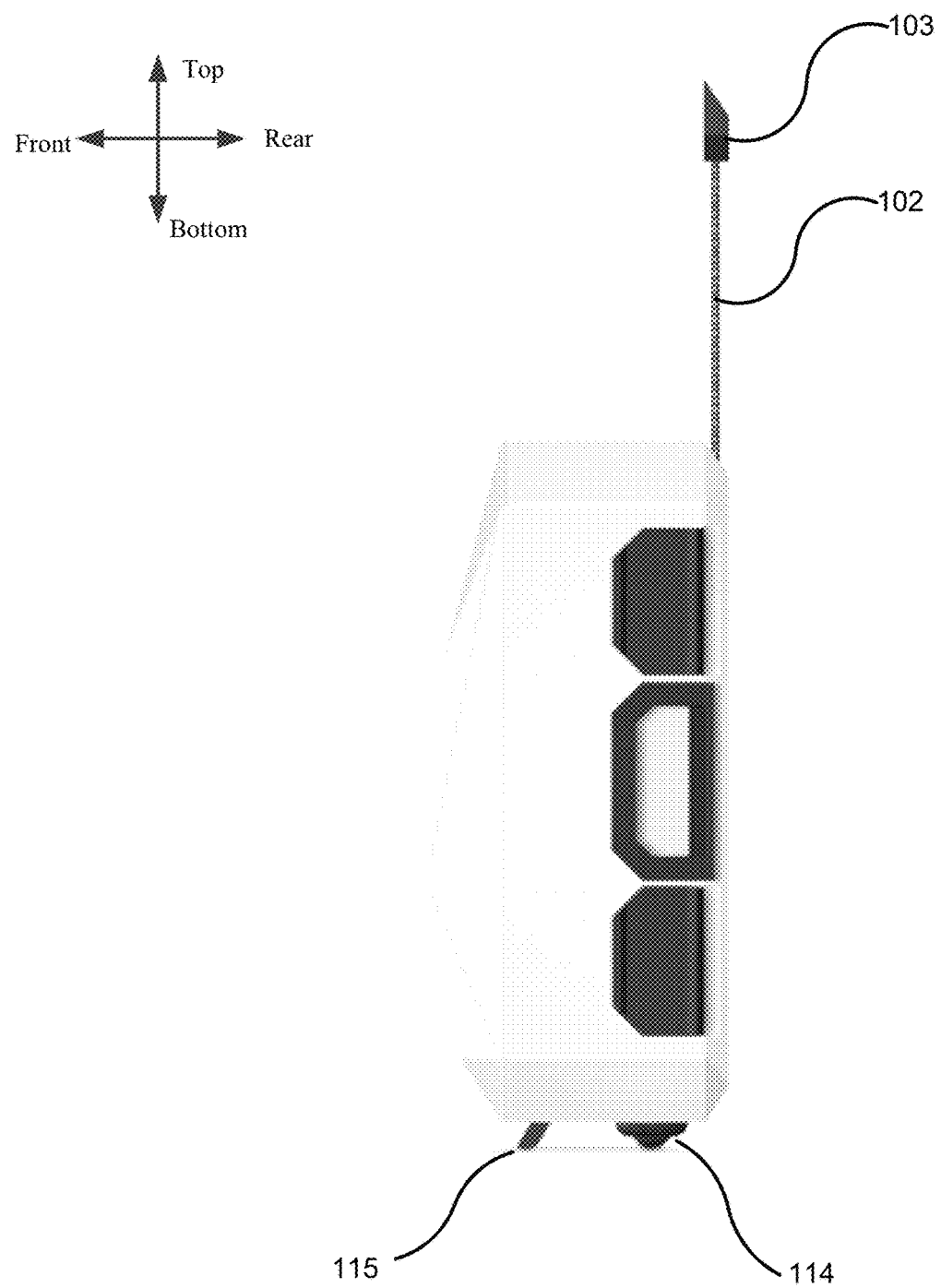
FIG. 2 is a diagram illustrating aspects of an example embodiment of luggage.

FIG. 2 illustrates a right side view of the luggage 100 with the wheels 114 and a kickstand 115 deployed from the bottom portion 108 of the luggage 100. The luggage 100 may have one or more wheels 114 for aiding a user in moving the luggage. Although only one wheel 114 is visible from this view, the example luggage 100 in FIG. 2 has two wheels 114. In some embodiments, the wheels 114 might only be deployed when the top handle 103 is moved out of the "in" position. In other words, the wheels 114 might remain inside the body 101 of the luggage until a user pulls the top handle out of the "in" position. As the top handle 103 is pulled (and as the stem 102 extends), the wheels 114 may descend from the body 101 of the luggage. When the stem 102 reaches its fully extended position, the wheels 114 may be entirely outside of the body 101 of the luggage. On the other hand, as the top handle 103 is pushed back into the body of the luggage 103 (e.g., towards the "in" position), the wheels 114 may ascend into the body 101 of the luggage 100. When the top handle 103 is moved back to the "in" position, the wheels 114 may entirely return to the inside of the body 101 of the luggage 100.

The wheels 114 may be attached to one or more plates (e.g., metal plates) used in one or more weighing mechanisms (e.g., weight sensors or scales) configured to detect a weight of the luggage 100. For example, the luggage 100 may include two plates—a bottom plate and a top plate—towards the bottom of the luggage 100. The wheels 114 may be fixed to a bottom surface of the top plate, which may move up and down. Meanwhile, the bottom plate may be fixed to the body 101 of the luggage 100 (e.g., fixed to a wheel well in the luggage 100 or the bottom portion 108). One or more studs (or pegs) and springs (which may be wrapped/coiled around the studs) may be between the bottom plate and the top plate. The stud(s) may hold the spring(s) in place and act as a guide for the top plate as it moves up and down with respect to the bottom plate. A cable (e.g., a 1/16 inch metal cable or wire) may be connected to the stem 102 so that when the stem 102 is extended upward the cable pulls the top plate towards the bottom plate. For example, one end of the cable may be connected to the stem 102 and the cable may travel down and bend/turn up through the bottom plate and then through the top plate. The other end of the cable may be connected to a stopper on a top side of the top plate. The stopper may keep tension on the cable when the top plate is pulled down, so that the cable does not move out of position. The spring(s) may compress allowing the top plate to move downward. As the top plate moves downward, the wheels 114 on the underside of the top plate may be deployed to a position outside of the luggage 100. For example, the wheels 114 may pass through respective openings in the bottom plate and bottom portion 108 to a position outside of the luggage 100. In sum, removing the top handle 103 from the "in" position may cause the stem 102 to extend out of the luggage 100 which may pull part of the cable upward and a curved part of the cable downward which in turn may pull the top plate downward which in turn may deploy the wheels 114. As the top handle 103 is returned to the "in" position, the spring(s) between the top and bottom plates may cause the top plate to return to its upward position thereby retracting the wheels 114.

In other embodiments, other arrangements may be implemented to deploy the wheels 114. For example, a cable or arm may be connected to the stem 102 so that when the stem 102 extends upward, the cable or arm pushes the top plate downward. This downward movement of the top plate may cause the wheels 114, which are attached to the underside of the top plate, to be deployed to the outside of the luggage 100. In some instances, two top plates and two bottom plates may be used. In such embodiments, one or two separate cables may be used to move the top plates down.

In some embodiments, the luggage 100 may include an electric motor for deploying the wheels 114. For example, a computing device of the luggage 100 may send an electrical signal instructing an electric motor to drive the top plate(s) down and the wheels 114 out of the luggage 100. This electrical signal may be sent in response to detection by a sensor (e.g., a proximity sensor) that the top handle 103 is removed from its "in" position within the luggage 100. Additionally, or alternatively, this electrical signal may be sent in response to a user's selection to obtain the weight of the luggage 100. That is, in response to a user selection to obtain the weight of the luggage, the computing device of the luggage 100 may transmit an electrical signal to an electric motor to drive the top plate(s) down and the wheels 114 out of the luggage 100, so that the luggage may rest on the wheels 114 and the weight may be obtained from a sensor (e.g., a load cell) between the plates.

The kickstand 115 may also extend from the bottom portion 108 of the luggage 100. The kickstand 115 may be a rectangular or triangular shaped plate or panel or other arm that is configured to keep the luggage 100 upright when the wheels 114 are deployed. The kickstand 115 might have a beveled edge or be curved to provide a greater surface area for contacting the ground or floor. The kickstand 115 might be configured to protrude from the bottom portion 108 of the luggage at an angle in order to balance the luggage 100 in an upright position. As shown in FIG. 2, the luggage 100 is in the upright position and the weight of the luggage is resting on the kickstand 115. In some embodiments, the kickstand 115 may swing open about a hinge.

In some embodiments, the kickstand 115 may be deployed along with the wheels 114 as the top handle 103 is removed from its "in" position. That is, the kickstand 115 may reside inside the body 101 of the luggage and might only be deployed when the top handle 103 is pulled out of the "in" position. For example, the kickstand 115 may be attached to an underside of the top plate of the weighing mechanism so that when the top plate moves down, the kickstand is deployed outside of the luggage along with the wheels 114. Like the wheels 114, the kickstand 115 may return back inside the body 101 of the luggage 100 when the top handle is pushed back into the "in" position. If the kickstand 115 is configured to move in and out of the luggage 100, the luggage 100 may have a flap, like the flaps 602 (see FIG. 6A), for covering an opening through which the kickstand 115 passes. Like the flaps 602, movement of the kickstand flap may be electronically controlled (e.g., moved by an electric motor) or manually controlled (e.g., pushed by the kickstand 115 or opened by a cable attached to the wheel and handle assembly).

In other embodiments, the kickstand 115 might remain outside of the body 101 of the luggage at all times. In this case, the kickstand 115 may flip from a closed/in position in which it lays flat against the bottom portion 108 of the luggage 100 to an open/out position (as shown in FIG. 2) in which it protrudes from the bottom portion 108 of the luggage 100 so that the luggage might rest against the kickstand 115. The kickstand 115 might automatically flip to the open/out position when the wheels 114 are deployed or when the top handle 103 is removed from the "in" position. Conversely, the kickstand 115 might automatically flip back to the closed/in position when the wheels 114 are retracted into the luggage 100 or when the top handle 103 is pushed back into the "in" position.

Additionally, or alternatively, the kickstand 115 may be manually operated by a user of the luggage 100. For example, a user may flip the kickstand 115 to the closed/in position or open/out position as he/she desires. The kickstand 115 may be manually positioned as a result of the user's direct contact with the kickstand 115 or as a result of the user's operation of a manual input (e.g., a push button) or virtual input (e.g., soft button on a screen on the luggage 100). For example, a user may press a virtual button on a screen on the top portion 107 of the luggage 100 to cause the luggage 100 to deploy the kickstand 115 or flip the kickstand 115 to the open/out position.

Figure 3:
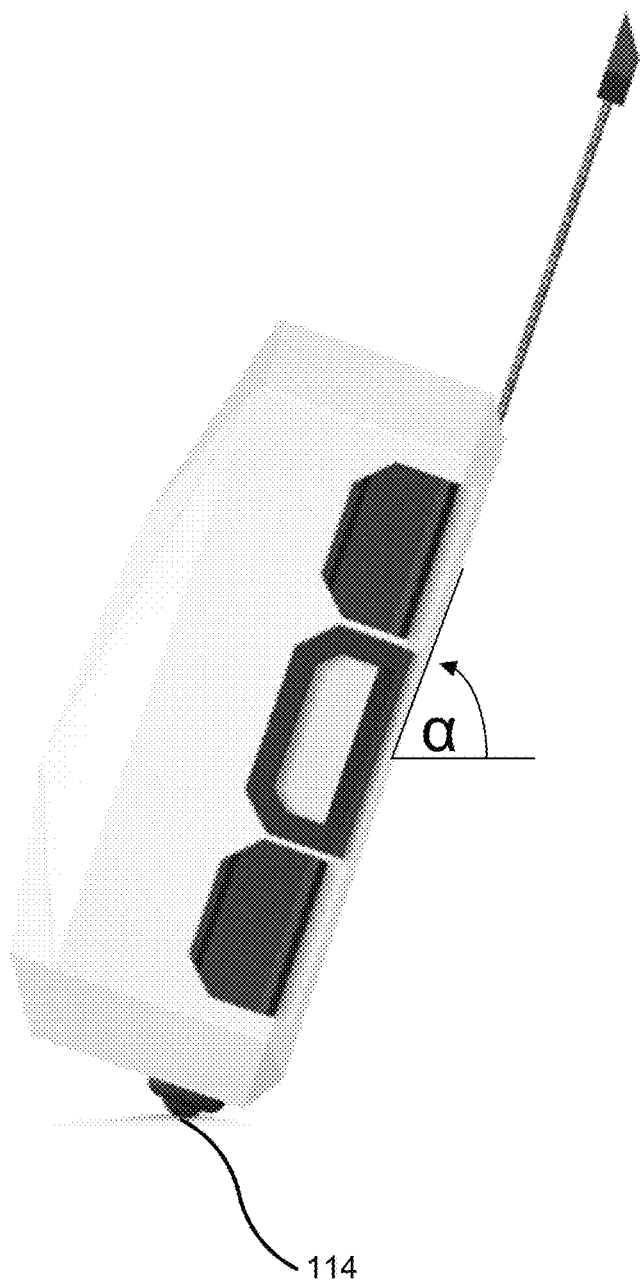
FIG. 3 is a diagram illustrating aspects of an example embodiment of luggage.

FIG. 3 illustrates another right side view of the luggage 100. However, in FIG. 3, instead of being in the upright position as in FIG. 2, the luggage 100 is tilted. Specifically, the luggage 100 in FIG. 3 is tilted at an angle α of approximately 50 degrees. The luggage 100 may be tilted when the user manipulates (e.g., pulls) the top handle 103. For example, the luggage 100 may be tilted when the user pulls the top handle 103 in a horizontal (front to rear) direction. Tilting the luggage may make it easier for the user to move the luggage 100 (e.g., roll the luggage on its wheels 114).

Notably, in FIG. 3, the wheels 114 are deployed, but the kickstand 115 is not. The kickstand 115 may be moved to a closed/in position when the luggage 100 is rolled so that the kickstand 115 does not interrupt movement of the luggage (e.g., does not impede movement of the luggage 100 by getting snagged on an object). FIG. 3 illustrates an embodiment of the luggage 100 in which the kickstand 115 may be retracted into the body of the luggage 100 or may flip back to a closed/in position (in which it lays flat against the bottom portion 108 of the luggage 100) when the luggage is tilted at an angle α that is less than or equal to a predetermined threshold angle. For example, the kickstand 115 may start out in an open/out position when the luggage is in the upright position. Then, when a user tilts the luggage 100 to roll the luggage 100 on its wheels 114, the kickstand 115 may move to the closed/in position once the luggage is tilted so that it is at an angle α that is less than the predetermined threshold angle. In some embodiments, the predetermined threshold angle may be approximately 80 degrees. In such embodiments, if the luggage 100 is tilted to have an angle α of 80 degrees or less, the kickstand 115 may automatically move to the closed/in position. The angle at which the luggage 100 is tilted may be determined by a computing device within the luggage based on measurements taken from a gyroscope, accelerometer, or other device within the luggage 100. In some embodiments, the determination to retract the kickstand 115 may be based on movement of the luggage. For example, if an accelerometer in the luggage indicates that the luggage is being moved (e.g., acceleration exceeds a predetermined threshold), then a computing device within the luggage 100 may control the kickstand to be retracted. When the user stops moving the luggage 100 or goes to stand the luggage 100 upright after tilting the luggage 100, the kickstand 115 may move back to the open/out position. For example, if the user finishes moving the luggage 100 and starts to stand the luggage 100 upright, the computing device may determine that the angle α is greater than the predetermined angle (e.g., 80 degrees) and may cause the kickstand 115 to be deployed (e.g., moved to the open/out position).

Figure 4:
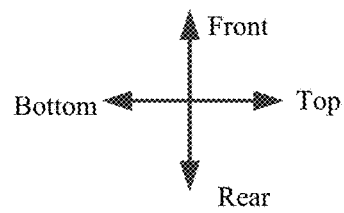
FIG. 4 is a diagram illustrating aspects of an example embodiment of luggage.
Figure 4:
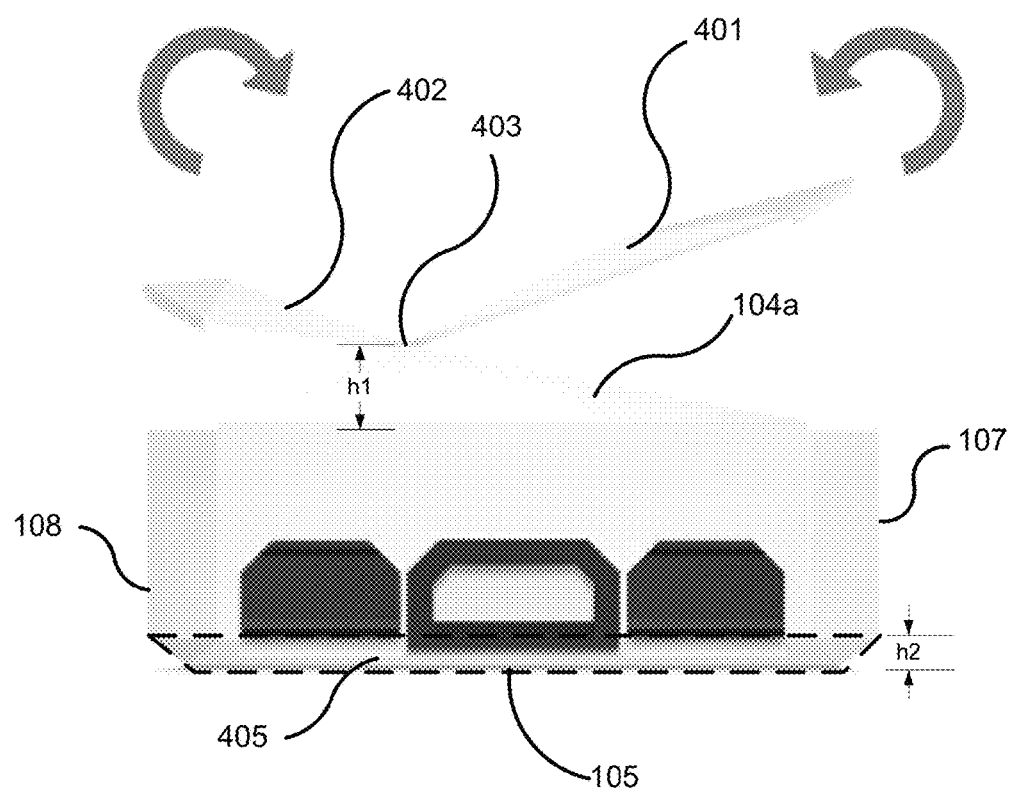

FIG. 4 illustrates yet another right side view of the luggage 100 where the luggage 100 is laying on its rear portion 105. As shown in FIG. 4, in an example embodiment, the luggage 100 may include two lids (or hatches, covers, etc.): an upper lid 401 towards the upper part of the luggage 100 and a lower lid 402 towards the bottom part of the luggage 100. In this example, the upper lid 401 is larger than the lower lid 402. In other examples, the upper lid 401 and lower lid 402 may be the same size or the lower lid 402 may be larger than the upper lid 401.

As illustrated by arrows in FIG. 4, the upper lid 401 and lower lid 402 may rotate outwards from the luggage 100. The axis of rotation may be located at the joint 403 that keeps the upper lid 401 and lower lid 402 connected to the luggage 100, but allows the upper lid 401 and lower lid 402 to rotate. The joint 403 may be located at an apex of a particular front facet 104a among the plurality of front facets 104x. This apex may have a height h1 of approximately 5 cm or may be in the range of 1 cm to 15 cm. The joint 403 may extend in the right-left direction across the width of the luggage 100 (into the page with FIG. 4) to an apex of another one of the front facets 104x.

In some embodiments, the joint 403 may include one or more hinges that allow the upper lid 401 and lower lid 402 to rotate. The hinge(s) may be made of various materials, such as metal (e.g., aluminum, steel, zinc, etc.), plastic, carbon fiber, etc. The hinge may be on the inside of the luggage 100 so as not to be visible from outside of the luggage 100 when the upper and lower lids are closed. The joint 403 may be locked in response to an electronic signal so as to prevent the upper lid 401 and/or lower lid 402 from rotating. Thus, when the upper lid 401 and/or lower lid 402 are closed the joint 403 may be locked to prevent people from opening the lids thereby keeping the contents of the luggage 100 secure. In some embodiments, the joint 403 may be locked when the upper lid 401 and/or lower lid 402 are open so that access to the interior of the luggage 100 may be made more convenient for a user so the user does not have to hold the upper lid 401 and/or lower lid 402 open. In some embodiments, a hydraulic mechanism may be used to keep the upper lid 401 and/or lower lid 402 open while the user is loading or unloading items into or from the luggage 100. The hydraulic mechanism may hold the upper lid 401 and/or lower lid 402 open in a manner similar to how hydraulic mechanisms hold the hood of a car open.

In some cases, the joint 403 may be locked so as to prevent only the upper lid 401 from being opened, while allowing the lower lid 402 to be opened. Vice versa, in some cases, the joint 403 may be locked so as to prevent only the lower lid 402 from being opened, while allowing the upper lid 401 to be opened.

In some embodiments, the joint 403 is not configured to be locked. Rather, the upper lid 401 and lower lid 402 may be locked by one or more latches (e.g., anchor latches, spring latches, slam latches, etc.) located along the periphery of the upper and lower lids 401 and 402. For example, the upper lid 401 may include a first portion (e.g., an anchor) of a latch (not shown) at the far right side in FIG. 4 that latches to a second portion (e.g., spring loaded receptacle) of the latch on the top portion 107 of the luggage 100. The first and second portions of the latch may be located on the inside of the upper lid 401 and inside of the top portion 107 so as not to be visible from outside of the luggage when the upper lid 401 is closed. In addition to providing improved aesthetics, this prevents the latch from being tampered with by those looking to impermissibly access the luggage. Additional latches may be used to secure the upper lid 401 in the closed position. The parts of the additional latches may be on the top portion 107 of the luggage 100 or on the front facet 104a.

In some embodiments, the upper lid 401 may be formed with an engagement portion that may be used in conjunction with a latch (e.g., a spring loaded slam latch) fixed to the top portion 107. The engagement portion may be a barrier or catch that is integral with the upper lid 401 (e.g., formed during molding of the upper lid 401) and fits inside a receptacle of the latch fixed to the top portion 107 so that when the upper lid 401 is closed, the latch locks the upper lid 401 to the shell/body of the luggage 100. As described further herein, the upper lid 401 may be opened when a solenoid releases the spring in the latch which releases the engagement portion of the upper lid 401.

On the other hand, in some embodiments, the top portion 107 (or other portion of the shell/body) may be formed with an engagement portion that may be used in conjunction with a latch (e.g., a spring loaded slam latch) fixed to the upper lid 401. The engagement portion may be a barrier or catch that is integral with the shell/body (e.g., formed during molding of the shell/body) and fits inside a receptacle of the latch fixed to the upper lid 401 so that when the upper lid 401 is closed, the latch locks the upper lid 401 to the shell/body.

The lower lid 402 may also include one or more latches (e.g., anchor latches, spring latches, slam latches, etc.) for locking the lower lid 402 in the closed position. For example, the lower lid 402 may include a first portion of a latch (not shown) at the far left side in FIG. 4 that latches to a second portion of the latch on the bottom portion 108 of the luggage 100. The first and second portions of this latch may be located on the inside of the lower lid 402 and inside of the bottom portion 108 so as not to be visible from outside of the luggage when the lower lid 402 is closed. Additional latches may be used to secure the lower lid 402 in the closed position. The parts of the additional latches may be on the bottom portion 108 of the luggage 100 or on the front facet 104a. The latches used for locking the lower lid 402 may be similar to or different from those used to lock the upper lid 401. For example, a latch used to lock the lower lid 402 may be smaller than the latch or latches used to lock the upper lid 401 in cases where the lower lid 402 is smaller than the upper lid 401.

In some embodiments, the lower lid 402 may be formed with an engagement portion that may be used in conjunction with a latch (e.g., a spring loaded slam latch) fixed to the bottom portion 108. The engagement portion may be a barrier or catch that is integral with the lower lid 402 (e.g., formed during molding of the lower lid 402) and fits inside a receptacle of the latch fixed to the bottom portion 108 so that when the lower lid 402 is closed, the latch locks the lower lid 402 to the shell/body of the luggage 100. As described further herein, the lower lid 402 may be opened when a solenoid releases the spring in the latch which releases the engagement portion of the lower lid 402.

On the other hand, in some embodiments, the bottom portion 108 (or other portion of the shell/body) may be formed with an engagement portion that may be used in conjunction with a latch (e.g., a spring loaded slam latch) fixed to the lower lid 402. The engagement portion may be a barrier or catch that is integral with the shell/body (e.g., formed during molding of the shell/body) and fits inside a receptacle of the latch fixed to the lower lid 402 so that when the lower lid 402 is closed, the latch locks the lower lid 402 to the shell/body.

The one or more latches used to lock the upper lid 401 and lower lid 402 may be controlled by electronic signals. For example, to lock a lid, an electronic signal may be sent to trigger an actuator (e.g., solenoid) to move a portion of the latch to prevent the latch from releasing. On the other hand, to unlock a lid, an electronic signal may be sent to an actuator to release a portion of the latch (e.g., a wedge portion) thereby allowing a spring in the latch to pop a lid (e.g., the upper lid 401 or lower lid 402) open. One or more first electronic signals may be used to control one or more latches to lock the upper lid 401, while one or more second electronic signals may be used to control the one or more latches to unlock the upper lid 401. Similarly, one or more third electronic signals may be used to control one or more latches to lock the lower lid 402, while one or more fourth electronic signals may be used to control the one or more latches to unlock the lower lid 402. Any of these four electronic signals may be the same or different. Moreover, any of these electronic signals may be analog or digital signals. Also, a single signal may be used to unlock or lock both the upper lid 401 and lower lid 402 simultaneously. Alternatively, the upper and lower lids may be separately controlled to be individually locked or unlocked.

The electronic signals may be generated by a microcontroller, microprocessor, integrated circuit, or other computing device within the luggage 100. These electronic signals may be generated when a particular user is identified and/or authenticated as described in further detail herein. For example, these electronic signals may be generated when a user selects an option on a touchscreen on the luggage 100 to perform authentication and then successfully completes an authentication process (e.g., iris scanning) allowing the user to have access to the luggage 100. In some embodiments, the electronic signals may be generated by a user's mobile device (e.g., a smartphone). For example, a user may hold his/her mobile device close to the luggage 100 (or close to a particular lid of the luggage 100) to open the upper and/or lower lids 401 and/or 402. Various technologies, such as near field communication (NFC), Bluetooth, Zigbee, WiFi direct, etc., may be employed to achieve this functionality.

In some embodiments, sensors, such as magnetic sensors (e.g., Hall effect sensors) and various proximity sensors, may be used to determine whether the upper lid 401 and/or lower lid 402 are open or closed. For example, a sensor on the interior of the top portion 107 of the luggage 100 may detect a magnet on the interior of the upper lid 401 when the upper lid 401 is closed and transmit a signal reporting the detection to a microcontroller or other computing device of the luggage 100. In response to receipt of such a signal, the microcontroller or other computing device may determine that the upper lid 401 is closed. This information may then be shared with the user via a display on the luggage 100 or via the user's mobile device (e.g., smartphone).

In some examples, the luggage 100 may include one or more lights that turn on when the luggage is opened (e.g., when upper lid 401 and lower lid 402 are opened) and turn off when the luggage 100 is closed (e.g., when upper lid 401 and lower lid 402 are closed). Such lights may help a user view or inspect contents of the luggage 100. For example, the lights may be placed on an interior surface of the upper lid 401 so that when upper lid 401 is open, the light(s) may shine light into a compartment of the luggage 100. Additionally, or alternatively, lights may be mounted on an outside of the luggage to, for example, notify a user that the luggage is locked or unlocked. The lights may be, for example, LED lights. The lights may be controlled by the microcontroller or other computing device described herein.

In some embodiments, edges of the lid(s) (e.g., upper lid 401 and lower lid 402) and edges of the opening to the interior of the luggage may be lined with seals or gaskets so that a compression seal is formed when the lid(s) are closed. The seal may be watertight so that water cannot enter the interior of the luggage 100. In some cases, this seal may help the luggage 100 to float in case it is in water.

Still referring to FIG. 4, the luggage 100 may include a rear compartment 405 (dashed lines have been added to outline the rear compartment 405 for ease of understanding). The rear compartment 405 may include the microcontroller, microprocessor, integrated circuit, or other computing device described herein. The rear compartment may also include a battery (e.g., carbon battery, lithium polymer battery, lithium ion battery, alkaline battery, etc.) or fuel cell (e.g., solar fuel cell). In some instances, the battery may be rechargeable via a USB port or other port. Additionally, or alternatively, the battery may be rechargeable via inductive charging or wireless/contactless charging.

In some embodiments, the rear compartment 405 may have a height h2 of approximately 1 inch or approximately 2 cm. In other embodiments, the height h2 may be greater or less than 1 inch. In addition to housing the microcontroller or other computing device, the rear compartment 405 may also house the top handle 103 (when the top handle is in the "in" position), the stem 102, and other parts of the wheel and handle assembly (i.e., portions connecting the wheels 114 to the top handle 103, such as a cable).

Figure 5A:
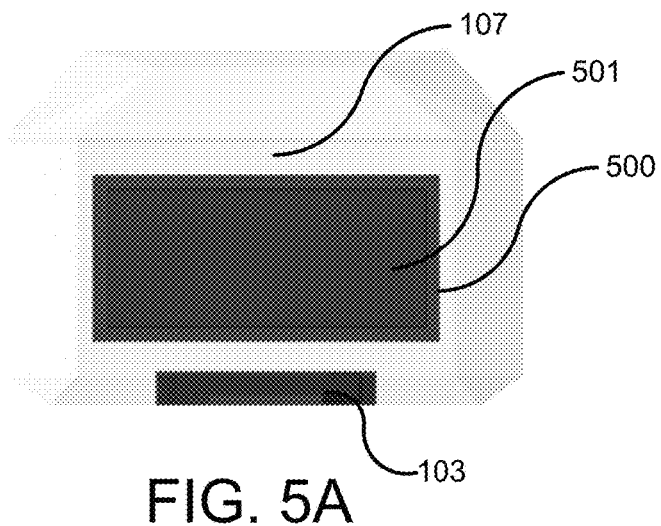
FIGS. 5A-5C are diagrams illustrating aspects of an example embodiment of luggage.
Figure 5B:
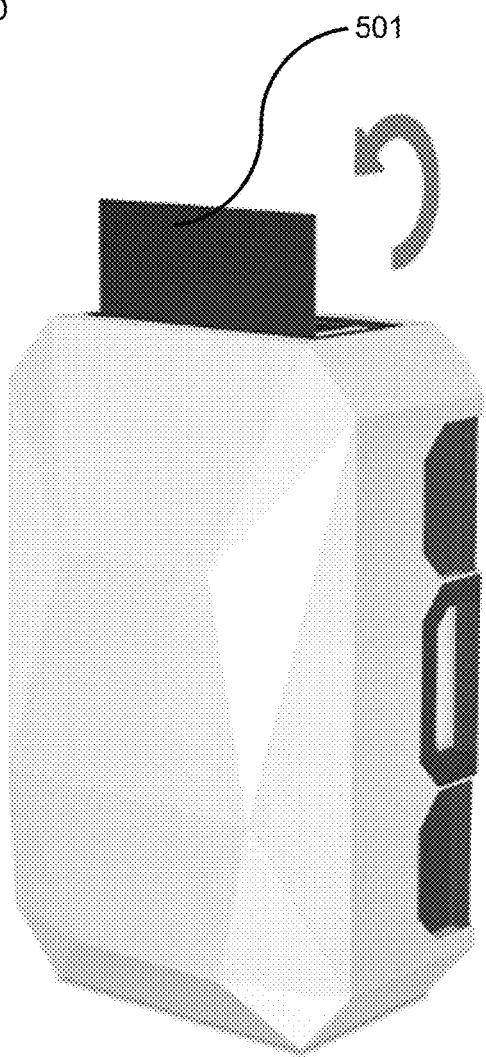

FIG. 5A illustrates an example top view of the luggage 100. From this view, the top portion 107 and top handle 103 are visible. As shown in FIG. 5A, the top portion 107 may include an input/output (I/O) component 500. The I/O component 500 may be configured to input and output various information. For example, the I/O component 500 may include a display device for inputting or outputting information to a user of the luggage 100. The display device may comprise a screen, such as a liquid crystal display (LCD) screen, plasma screen, LED screen, etc., as well as circuitry for converting electronic signals and data into graphical interfaces for display on the screen. In some embodiments, as shown in FIG. 5A, the luggage 100 may have a cover 501 to protect the screen. The cover 501 may flip up (e.g., rotate upwards) or otherwise be moved to view the screen below. FIG. 5B includes an arrow depicting an example movement of the cover 501. The user may move the cover 501 by directly contacting the cover 501 or by manually operating another input (e.g., a push button) that causes the cover 501 to move. For example, a user may press a push button that releases a latch so that a spring may flip the cover 501 up to reveal the screen of the I/O component 500.

Although FIG. 5B illustrates the cover 501 rotating up and towards the front, it should be understood that the cover 501 may move in various directions in various embodiments. For example, in some embodiments, the cover 501 may rotate up and to the left or right. Also, in some embodiments, rather than rotate, the cover 501 may slide towards the front, back, left, or right.

Figure 5C:
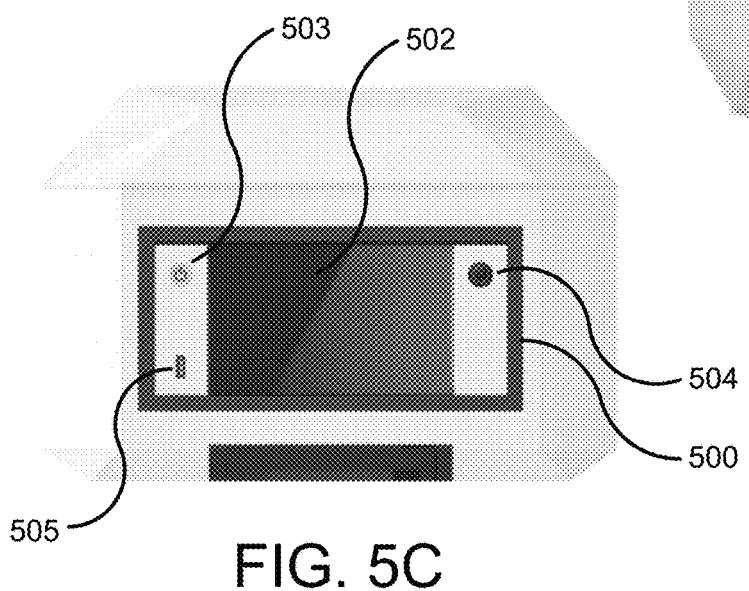

FIG. 5C illustrates another example top view of the luggage 100. In FIG. 5C, the cover 501 is removed for sake of convenience and so that the screen 502 of the display device is visible. Here, the screen 502 is shown as having a black background. The screen 502 may have this black background when the display device is in a sleep or standby mode or off. The display device may enter into a sleep or standby mode or turn off when, for example, the cover 501 covers the screen 502, when a predetermined period of time elapses since the screen 502 has last been manipulated, when the luggage 100 is in motion, when a paired mobile device moves away from the luggage, etc. Although not shown in FIG. 5C, it should be understood that the screen 502 may be configured to display various types of information to a user of the luggage or others (e.g., those who find the luggage when it is lost). By way of example, the screen 502 may display the weight of the luggage 100 including its contents, the temperature of the environment surrounding the luggage 100, the location (e.g., GPS coordinates, city, state, country, etc.) of the luggage 100, the time zone and/or time, flight information, user identification information (e.g., passport information, user's address, etc.), airport information (e.g., airport map including layout of terminals (including gate identifiers) and places therein, such as restrooms and places to eat, drink, shop, etc.), airline information (e.g., weight limits for baggage in different classes (e.g., coach, business class, first class, etc.), baggage costs, etc.), country information (e.g., statistics of country, state, city, etc. in which luggage 100 is located), etc. As another example, audio, images, video, and audio/video may be streamed or downloaded from the Internet or other network by a computing device within the luggage 100 for output (e.g., presentation or play) through the screen 502. Accordingly, the luggage 100 may be used as a portable media device so users may view movies, shows, or other media content on the go. In some embodiments, the screen 502 may include a touch screen so that users may enter inputs (e.g., swipe or press virtual buttons) via the screen 502.

In addition to the screen 502, the I/O component 500 may include one or more user input components 503. In the example of FIG. 5C, the user input component 503 is a power button. In some embodiments, a user (e.g., owner of the luggage 100 or other person) may press the power button 503 to turn on the screen 502 or awaken the screen 502 from a sleep or standby mode. Although only a single user input component 503 is illustrated in FIG. 5C, in other embodiments, there may be additional user input components 503. The additional user input components 503 may be different from one another. For example, two user input components 503 may be push buttons while a third user input component 503 may be a switch or dial. In some embodiments, the I/O component 500 might not have any user input components 503. In such embodiments, the screen 502 may awaken from a sleep or standby mode or turn on automatically upon the cover 501 being moved (rotated, flipped, slid, etc.) to reveal the screen 502.

FIG. 5C also illustrates that the I/O component 500 may include an identification device 504. The identification device 504 may be configured to identify and/or authenticate a person as a valid or authorized user of the luggage 100. For example, the identification device 504 may assist in determining whether a person trying to open the luggage is permitted to open the luggage. One or more specific people may be permitted to open the luggage 100, and thus, the identification device 504 may be configured to assist in determining whether a person attempting to open the luggage is one of these specific people. In some cases, only the person who locked the luggage 100 may be permitted to open the luggage 100, and thus, the identification device 504 may be configured to determine whether a person attempting to open the luggage 100 is the one who locked the luggage 100.

In some examples, the identification device 504 may include a biometric device, such as a retinal scanner, iris scanner, fingerprint reader (which may be built into the top handle 103 or any other handle of the luggage 100), etc., for capturing biometric information. Such biometric devices may ensure that only certain authorized people are able to access the interior of the luggage 100 or information stored in memory therein. The identification device 504 may also include a card reader, RFID reader, infrared reader, etc. Thus, only a person with a particular card, RFID tag/key, or infrared remote may be able to open the luggage 100. In some embodiments, a particular mobile device may have to be within a certain distance from the luggage in order for the luggage 100 to be opened, and thus, the identification device 504 may be any device that detects or communicates with a mobile device (e.g., an NFC reader).

In the example of FIG. 5C, the identification device 504 comprises an iris scanner. In some embodiments, a user (e.g., owner of the luggage 100 or other person) may press the power button 503 or another user input component 503 or select an option on the screen 502 (e.g., a virtual button on a touchscreen) to activate the iris scanner to scan the iris of a user. For example, the user input component 503 may be an input (e.g., push button) that, when selected, causes the identification device 504 to capture identification information. In some examples, when the power button 503 is selected, instructions may appear on the screen 502 to direct the user on how to complete the iris scanning. If scan data obtained by the iris scanner matches previously scanned data, the user may be allowed access to the interior of the luggage (e.g., the upper and/or lower lids may be unlocked). Although only a single identification device 504 is illustrated in FIG. 5C, in other embodiments, there may be additional identification devices 504. For example, the I/O component 500 may include an iris scanner and fingerprint reader for added security.

FIG. 5C also illustrates that the I/O component 500 may include a port 505. In the example of FIG. 5C, the port 505 comprises a universal serial bus (USB) port. In other embodiments, the port 505 may be any other type of interface for connecting to another computing device. For example, the port 505 may be a mini-USB port, an SD card port, an HDMI port, etc. The USB port 505 may allow a user to charge another device (e.g., a mobile device such as a smartphone or tablet) or to transfer data between the microcomputer or microprocessor of the luggage 100 and another device. As an example of a data transfer, updated map information for a GPS receiver within the luggage 100 may be transferred through the port 505. As another example, audio, images, video, and audio/video may be transferred through port 505 (e.g., from a mobile device) for output (e.g., presentation or play) through the screen 502. For example, the luggage 100 may be used as a portable media device so users may view movies or watch TV on the go. Also, software updates may be transferred through the port 505 to be loaded onto the microcontroller or microprocessor of the luggage 100. Although only a single port 505 is illustrated in FIG. 5C, in other embodiments, there may be additional ports 505. For example, the I/O component 500 may include multiple USB ports or a USB port and another type of port. Of course, in some embodiments, the I/O component might not have a port 505. In such embodiments, data might still be transferred between the computing device (e.g., microcontroller or microprocessor) within the luggage 100 and another computing device via a wireless communication protocol (e.g., WiFi, IEEE 802.11, IEEE 802.15, Bluetooth, etc.).

Although the I/O component 500 is shown as being on the top portion 107 of the luggage 100, it should be understood that the I/O component 500 may be on any other portion (e.g., the rear portion 105, front portion 104, side portions, etc.) of the luggage 100 in different embodiments. Further, the screen 502 may be smaller or take up the entirety of the top portion 107. In some instances, the screen 502 may have an oval or square shape. Also, in some cases, the top portion may be curved and the screen 502 may be curved.

Figure 6A:
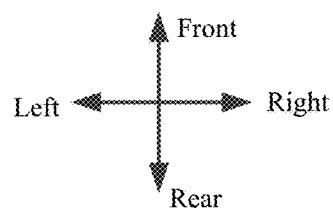
FIGS. 6A and 6B are diagrams illustrating aspects of an example embodiment of luggage.
Figure 6A:
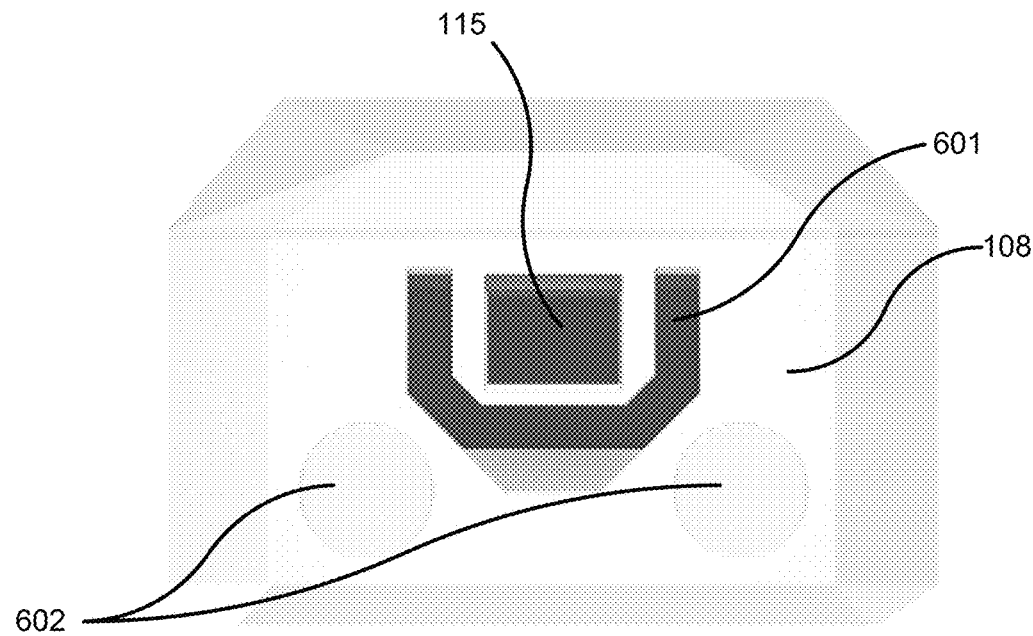

FIG. 6A illustrates an example bottom view of the luggage 100. As shown in FIG. 6A, a bottom handle 601 may be attached to the bottom portion 108. In FIG. 6A, the bottom handle 601 is shown in the closed position in which it lays within a recess in the bottom portion 108. The bottom handle 601 may flip up or rotate out to an open position so that a user may wrap his/her hand around the bottom handle 601. The shape of the bottom handle 601 may differ in other embodiments. For example, the bottom handle 601 may have a rounded U-shape in some embodiments or a rectangular shape in other embodiments. Also, the recess in the bottom portion 108 of the luggage 100 may have a different shape to match a shape of the bottom handle 601.

The bottom portion 108 may also include flaps 602 to cover the openings through which the wheels may be deployed. Movement of the flaps 602 may be electronically controlled (e.g., moved by an electric motor) or manually controlled (e.g., pushed by the wheels 114 or opened by a cable attached to the wheel and handle assembly). For example, as the stem 102 is extended a cable, wire, arm, and/or other device (e.g., a pulley or wedge) may move the flap(s) 602 (e.g., pull the flap(s) aside) so that the wheels 114 may pass through the openings covered by the flap(s) 602. In some embodiments, the flaps 602 may slide towards the front, rear, right, left, or any direction therebetween (e.g., front-right) when the wheels 114 are deployed. In other embodiments, the flaps 602 may flip out of the luggage 100 as the wheels 114 push against them during deployment. In some examples, the flaps 602 may be made of a different material than the bottom portion 108. The material used for the flaps 602 may be more flexible than the material used for the bottom portion 108. For example, the flaps 602 may be made of fabric while the bottom portion 108 may be made of a hard plastic, carbon fiber, or metal material.

The flaps 602 may keep dirt, dust, and other objects from entering the wheel well where the wheels 114 are stowed when the top handle 103 is in the "in" position. Although the flaps 602 are shown as having a circular shape in FIG. 6A, these flaps may have different shapes in different embodiments. For example, the flaps 602 may have a rectangular or octagonal shape. In some embodiments, the number of flaps 602 to wheels may be one-to-one. Alternatively, in some embodiments, there may be a single flap 602 through which multiple wheels 114 are deployed.

Figure 6B:
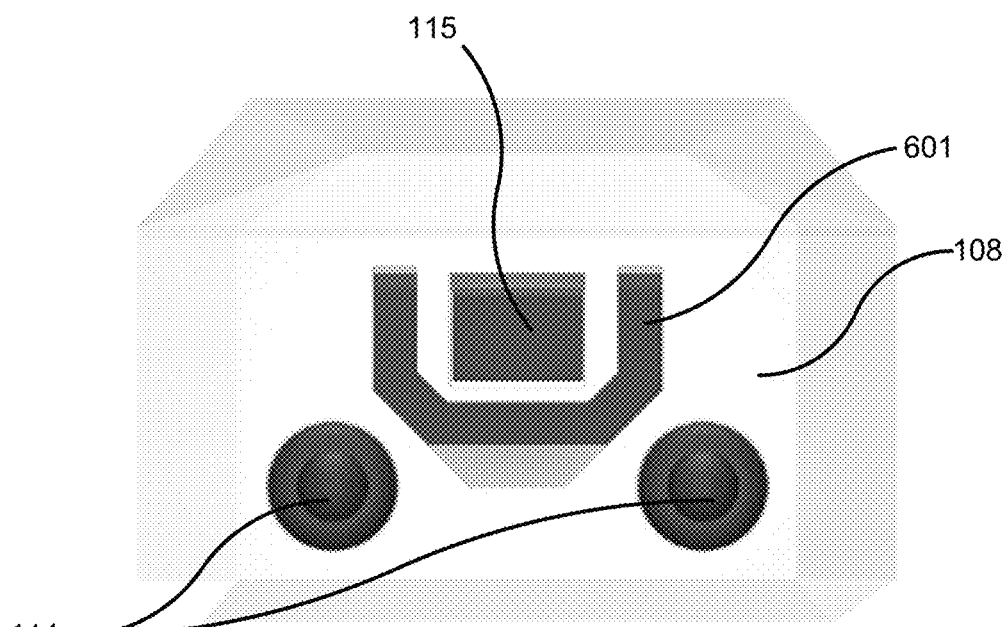

FIG. 6B illustrates another example bottom view of the luggage 100. As shown in FIG. 6B, the wheels 114 are deployed from the wheel well to an outside of the body 101 of the luggage 100. In this example, the wheels 114 are shown as 360 degree wheels. That is, the wheels 114 depicted in FIG. 6B can rotate in any direction to allow the luggage to roll in any direction. In other embodiments, the wheels 114 may be inline wheels that restrict rotation to front and rear directions. Still in some embodiments, in line wheels may be used, but they may be mounted to a swivel plate so as to achieve movement in 360 degrees.

FIG. 6B also shows an example of the location of the kickstand 115 on the bottom portion 108 of the luggage 100. In this example, the kickstand 115 is positioned at a center of the bottom handle 601 and towards the front of the luggage 100. This location may be useful to improve the balance of the luggage 100 when it is in the upright position (when the top portion 107 of the luggage 100 is facing the sky/ceiling). In other embodiments, the kickstand 115 may be in other positions. And, in some embodiments, there might not be any kickstand 115.

Additionally, the kickstand 115 in the example depicted in FIGS. 6A and 6B is always outside of the body 101 of the luggage. In other embodiments, the kickstand 115 may be stowed inside the body 101 of the luggage 100 (e.g., inside the wheel well or inside another well specifically designed for stowing the kickstand 115). In such embodiments, the bottom portion 108 may also include an additional flap for the kickstand like the flaps 602 for the wheels 114.

Figure 7:
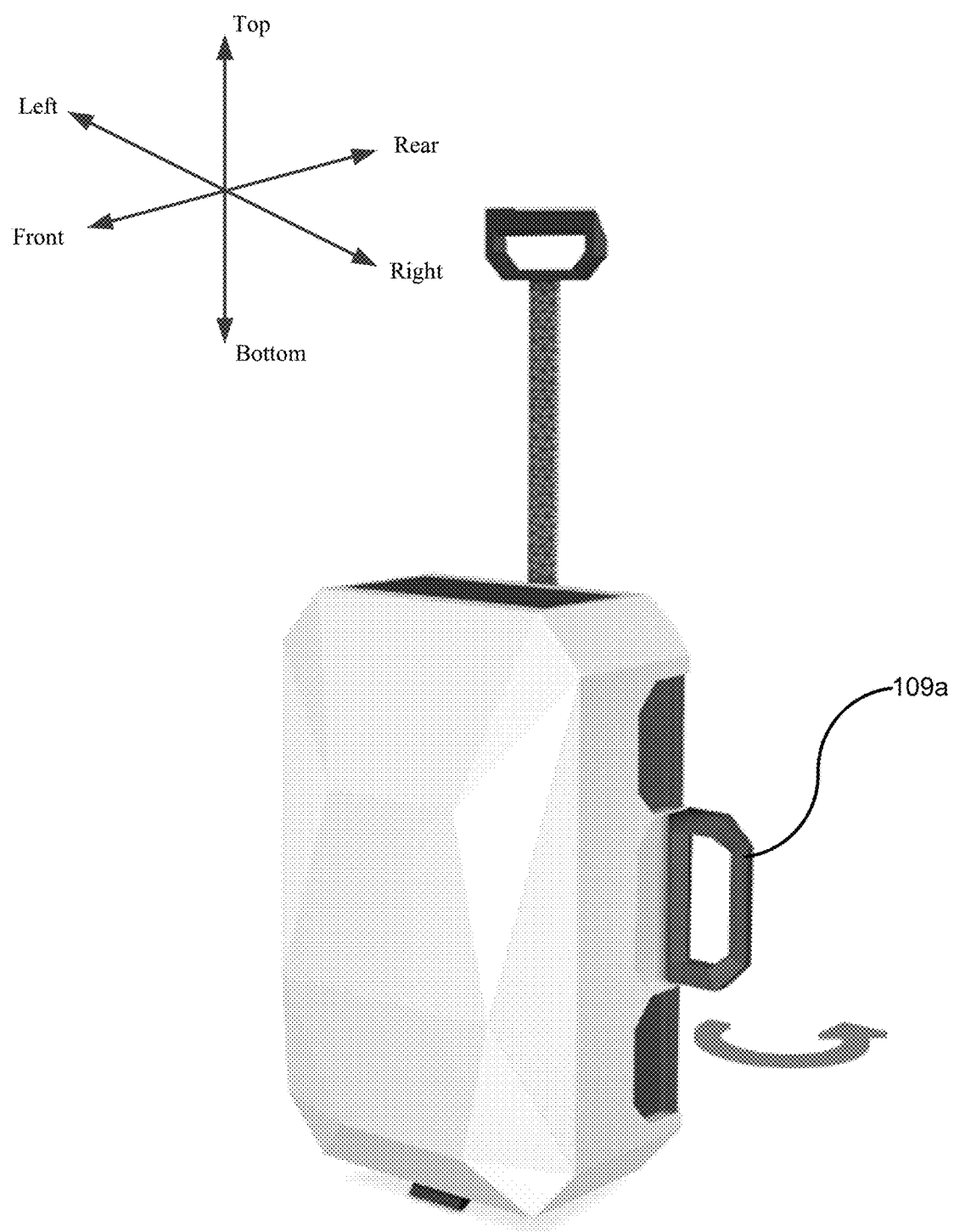
FIG. 7 is a diagram illustrating aspects of an example embodiment of luggage.

FIG. 7 illustrates another example perspective view of the luggage 100. In particular, FIG. 7 shows how the right side handle 109a may rotate away from the body 101 of the luggage so that a user may grip the right side handle 109a. This movement is depicted by the arrow in FIG. 7. When the right side handle 109a is not needed for carrying the luggage 100, it may be stowed in a recess on the right side portion 106a. Although not shown in FIG. 7, the left side handle 109b may move (e.g., rotate) in a similar manner. Further, although the right side handle 109a is shown as having a hexagonal shape in FIG. 7, the right side handle 109a (and left side handle 109b for that matter) may have different shapes in different embodiments. For example, the right side handle 109a may have a rectangular shape or rounded U-shape.

Figure 8:
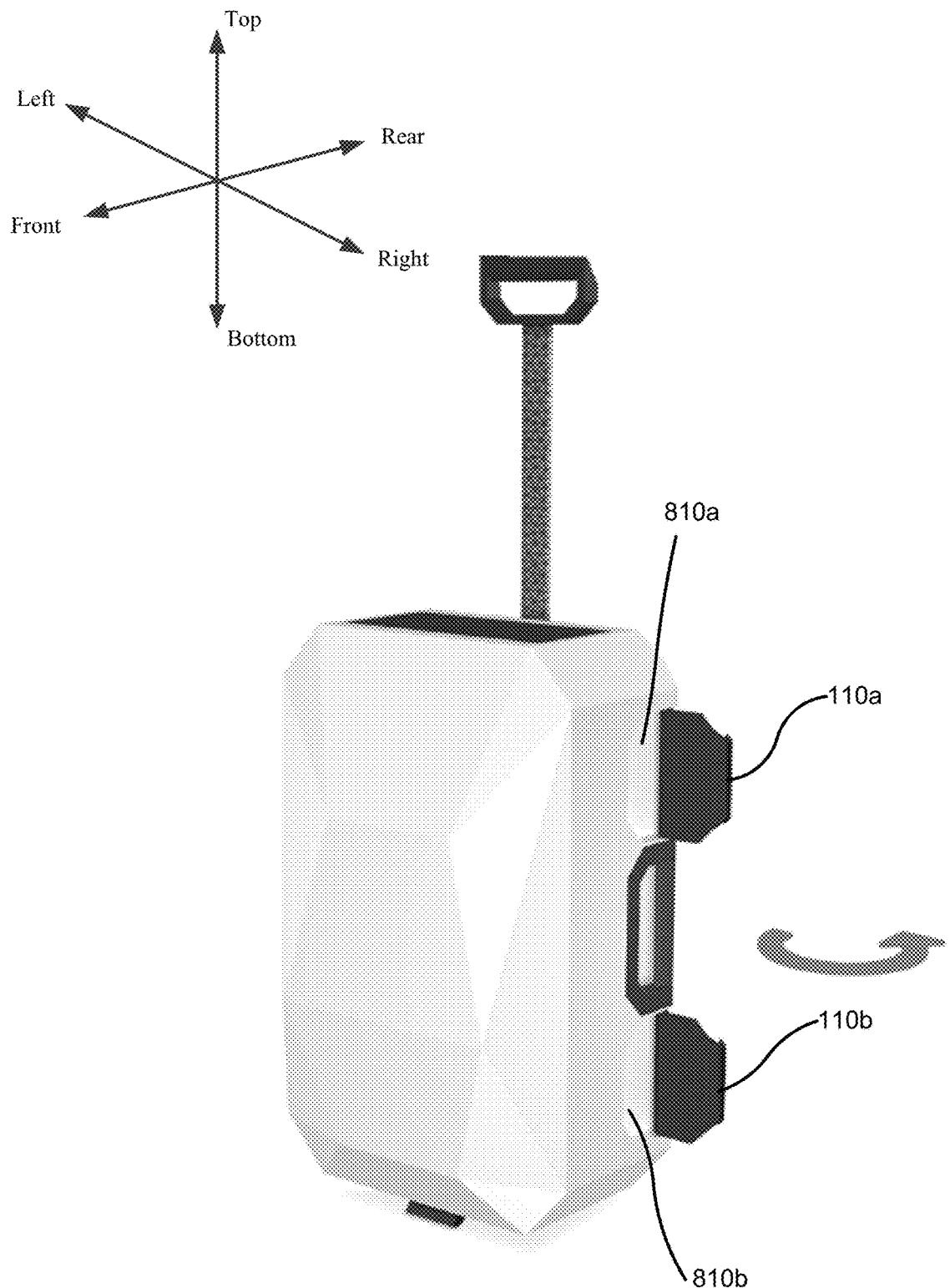
FIG. 8 is a diagram illustrating aspects of an example embodiment of luggage.

FIG. 8 illustrates yet another example perspective view of the luggage 100. In particular, FIG. 8 shows how the couplers 110a and 110b of the coupling mechanism 110 may rotate away from the body 101 of the luggage. This movement is depicted by the arrow in FIG. 8. As discussed in further detail herein, these couplers 110a and 110b may be used to couple the luggage 100 to another piece of luggage. When the luggage 100 is not coupled to another piece of luggage, the couplers 110a and 110b may be stowed in recesses 810a and 810b on the right side portion 106a. Although not shown in FIG. 8, the couplers 111a and 111b on the left side of the luggage 100 may move (e.g., rotate) in a similar manner. Further, it should be understood that the shape, size, and position of the couplers 110a and 110b may be different in different embodiments. For example, the couplers 110a and 110b (as well as the couplers 111a and 111b) may have a rectangular shape or semicircle shape. Accordingly, the shape, size, and position of the recesses 810a and 810b may also be different to accommodate the different couplers in different embodiments.

Figure 9:
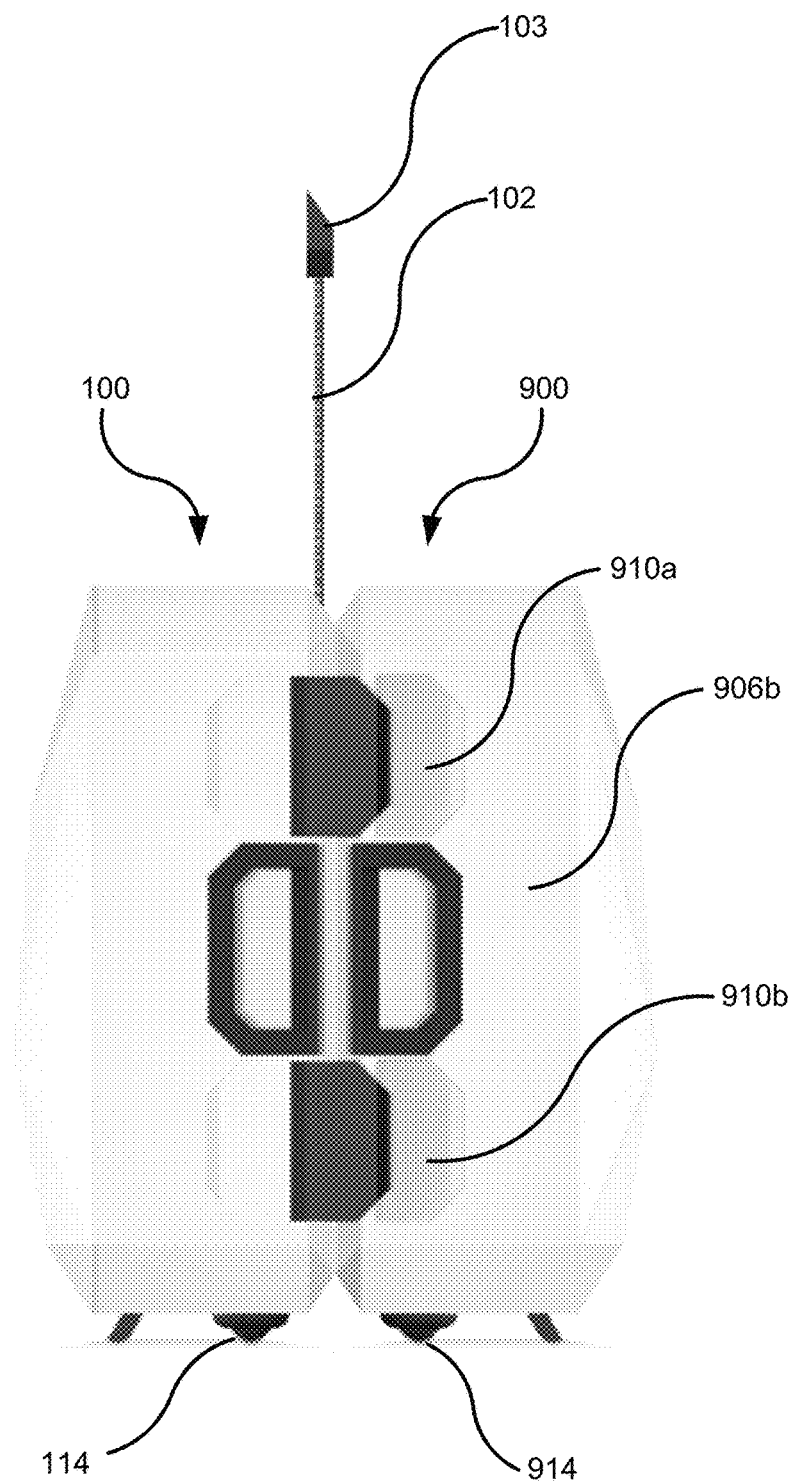
FIG. 9 is a diagram illustrating aspects of two example embodiments of luggage.

FIG. 9 illustrates an example side view of the luggage 100 when it is coupled or attached to another piece of luggage 900. Herein, luggage 100 may be referred to as "male luggage" or "male unit" and luggage 900 may be referred to a "female luggage" or "female unit." Luggage 900 may have similar portions (e.g., a similar front portion, side portions, bottom portion, and top portion) as the luggage 100. In some embodiments, the only difference between luggage 900 and luggage 100 may be that luggage 900 does not have couplers on its sides (e.g., right and left side portions) and instead simply has recesses. FIG. 9 illustrates the recesses 910a and 910b on the left side portion 906b of the luggage 900. It should be understood that the right side portion of the luggage 900 may also have recesses. In terms of size and shape, the recesses (e.g., recesses 810a and 810b) on the luggage 100 may match or be similar to the recesses (e.g., recesses 910a and 910b) on the luggage 900. The similarity of the luggage 900 to the luggage 100 may help to reduce manufacturing costs. In some cases, the luggage 100 and luggage 900 may be manufactured using the same process or same assembly line, and the coupling mechanisms 110 and 111 may be added to certain pieces of luggage at a later time (e.g., in a retail store or at the home of a buyer of the luggage 100) to arrive at the embodiment of the luggage 100.

As shown in FIG. 9, the couplers 110a and 110b of luggage 100 may extend from the luggage 100 and engage (e.g., latch, clip, or hook) with respective recesses 910a and 910b on the left side portion 906b of luggage 900. Although not shown, it should be understood that couplers 111a and 111b of luggage 100 may also extend from the luggage 100 and engage (e.g., latch, clip, or hook) with respective recesses on the right side portion of luggage 900. It should also be understood that in other embodiments, where the number of couplers on luggage 100 may be different, the number of recesses on luggage 900 may be different. For example, if luggage 100 has three couplers on a side, then luggage 900 may have three recesses on a side. The number of couplers to recesses, however, does not have to be one-to-one. For example, luggage 100 may have four couplers and the luggage 900 may have six recesses for receiving those couplers.

When the luggage 100 and luggage 900 are coupled together, a user may move (e.g., roll or carry) both pieces of luggage 100 and 900 using a single handle. For example, as shown in FIG. 9, the top handle 103 and stem 102 may extend out of luggage 100. The top handle 103 of luggage 100 may then be moved (e.g., pulled or pushed) to move both pieces of luggage 100 and 900. As such, luggage 900 may be moved without using a top handle (or any other handle) of the luggage 900. Likewise, only the top handle of the luggage 900 may be used to move both pieces of luggage 100 and 900. In some embodiments, movement of both pieces of luggage 100 and 900 may be restricted to movement in a direction into and out of the page/sheet on which FIG. 9 is illustrated.

In some embodiments, the luggage 100 and/or luggage 900 may detect when it is coupled (e.g., conjoined) with the other. The couplers of luggage 100 and/or recesses of luggage 900 may have a sensor (e.g., Hall effect sensor or proximity sensor) for detecting when luggage 100 and luggage 900 are coupled together. For example, coupler 110a may have a magnet that is detected (e.g., the magnet's magnetic field may be sensed) by a Hall effect sensor in luggage 900 when the coupler 110a engages with (e.g., latches to) recess 910a of luggage 900. Additionally, or alternatively, a sensor (e.g., Hall effect sensor) may be placed on the coupler, and a magnet may be placed on the recess with which the coupler engages. One or more sensors may be used. In some embodiments, the number of sensors may match the number of couplers or recesses. In other embodiments, only a single sensor may be used. Still, in some embodiments, one sensor may be used on each side of the luggage 100 and 900.

If a sensor is on the luggage 900, the sensor (e.g., Hall effect sensor) may notify a microcontroller, microprocessor, or other computing device of the luggage 900 of the detection. In some embodiments, the luggage 900 may display, on a display screen of the luggage 900, a notification that indicates to a user that the luggage 900 is coupled with another piece of luggage. Further, in some embodiments, once luggage 900 is coupled to luggage 100, the pieces of luggage 100 and 900 may be locked so that they cannot be separated until an authorized user allows them to be separated (e.g., by completing iris scanning authentication). Also, in some embodiments, in response to detection of the luggage being coupled, the computing device of the luggage 900 may initiate a communication session (e.g., a wireless communication session using a wireless communication protocol, such as Bluetooth) with the luggage 100. For example, the computing device of the luggage 900 may communicate with the computing device of the luggage 100, via a wireless communication session, to notify the luggage 100 that the pieces of luggage are coupled. The luggage 100 may then display, on the screen 502, a notification that informs a user of the luggage 100 that the luggage 100 is coupled to another piece of luggage 900. Additionally, or alternatively, the above described notifications may be sent to one or more mobile devices of users (e.g., husband and wife) of the luggage 100 and 900.

If a sensor is on the luggage 100, the sensor (e.g., Hall effect sensor) may notify a microcontroller, microprocessor, or other computing device of the luggage 100 of the detection. In some embodiments, the luggage 100 may display, on the screen 502, a notification that indicates to a user that the luggage 100 is coupled with another piece of luggage. Further, in some embodiments, once luggage 100 is coupled to luggage 900, the pieces of luggage 100 and 900 may be locked so that they cannot be separated until an authorized user of luggage 100 unlocks/releases the couplers of luggage 100 (e.g., by completing iris scanning authentication). Also, in some embodiments, in response to detection of the luggage being coupled, the computing device of the luggage 100 may initiate a communication session (e.g., a wireless communication session using a wireless communication protocol, such as Bluetooth) with the luggage 900.

In some embodiments, when the top handle 103 and stem 102 extend out of luggage 100, the wheels 114 of luggage 100 and the wheels 914 of luggage 900 may be deployed (e.g., descend from the luggage 100 and 900). In other words, the wheels 914 of luggage 900 may be deployed even though a top handle and stem of the luggage 900 are not extended out of the luggage 900. For example, when the luggage 900 detects that it is coupled to luggage 100, it may deploy its wheels 914. In some embodiments, the computing device of luggage 100 may transmit a command to the computing device of luggage 900 to deploy the wheels 914. For example, the computing device of luggage 100 may detect when the top handle 103 and stem 102 are extended from luggage 100 and, in response to this detection, may transmit a command to the computing device of luggage 900 to deploy its wheels 914. Additionally, or alternatively, luggage 100 or luggage 900 may include an input device (e.g., push button or virtual button displayed on a screen on the luggage) that allows a user to manually control when the wheels 114 or wheels 914 are deployed. Therefore, when a user couples luggage 900 to luggage 100, the user may select an option on luggage 900 to deploy the wheels 914 of luggage 900 even though the top handle of luggage 900 is not extended from the luggage 900. In some embodiments, the luggage 100 and luggage 900 may each include an electronic motor for deploying the wheels 114 and wheels 914, respectively.

Figure 10:
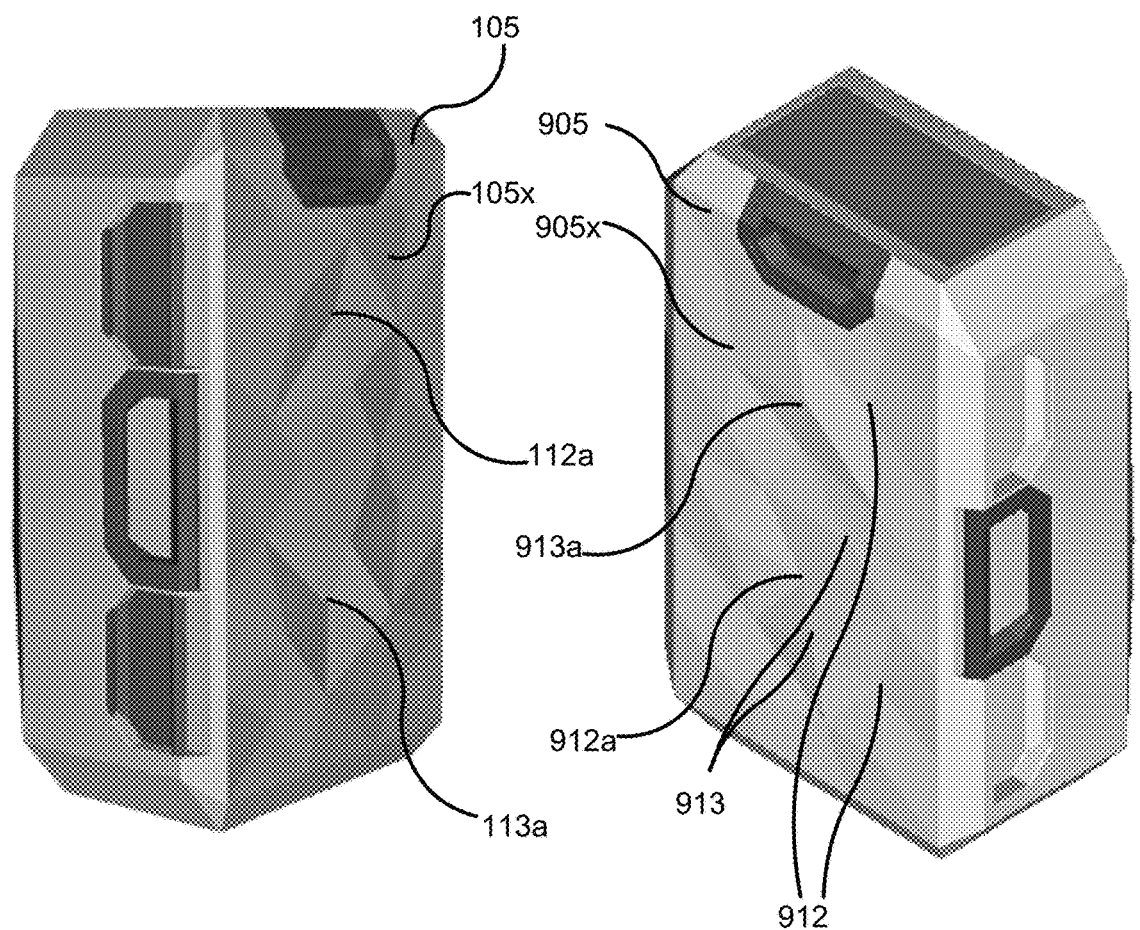
FIG. 10 is a diagram illustrating aspects of two example embodiments of luggage.

FIG. 10 illustrates a perspective view of luggage 100 and luggage 900 in a case where they are separated. In FIG. 10, the rear facets 905x of the rear portion 905 are shown. The rear facets 905x may be polygonal surfaces of various sizes and shapes. The rear facets 905x may be set at various angles to form divots 912 and protrusions 913. As shown in FIG. 10, the divots 912 of luggage 900 may complement the protrusions 113 of luggage 100. Vice versa, the divots 112 of luggage 100 may complement the protrusions 913 of luggage 900. In other words, the divots 112 and protrusions 113 may be formed to have sizes and shapes that fit with the protrusions 913 and divots 912, respectively. For example, divot 112a may engage with protrusion 913a, while protrusion 113a engages with divot 912a. These divots 112, 912 and protrusions 113, 913 may help to hold the luggage 100 and luggage 900 in place against each other when coupled. For example, the divots 112, 912 and protrusions 113, 913 may reduce an amount that (or prevent) the luggage 900 slides (or rubs) against the luggage 100. The divots 112, 912 and protrusions 113, 913 may also keep the luggage 900 from sliding off of the luggage 100 and becoming uncoupled during travel, for example. The divots 112, 912 and protrusions 113, 913 may provide increased surface area and therefore increased friction to assist in holding the luggage 100 and luggage 900 together tightly.

The number of divots and protrusions may vary. Also, the sizes, shapes, and locations of the divots 112, 912 and protrusions 113, 913 may vary. Even on the same piece of luggage, some divots may be deeper than others and some protrusions may protrude outward more than others.

Further, in some embodiments, instead of rear facets 105$x$ and 109$x$ forming divots 112 and 912 and protrusions 113 and 913, the rear portion 105 of the luggage 100 may include domes and the rear portion 905 of the luggage 900 may include craters to accommodate the domes. Alternatively, the rear portion 105 may include pegs and the rear portion 905 may include holes that accommodate the pegs. It should be apparent that many different shapes may be used for creating the engagement between the rear portion 105 of the luggage 100 and the rear portion 905 of the luggage 900. Also, a combination of different shapes may be used in the same embodiment. Still, in some embodiments, the rear portion 105 and rear portion 905 may be flat. Moreover, in some embodiments, a mat (e.g., a rubber mat) or film may be placed on one or both of the rear portions 105 and 905 to create friction (e.g., static friction) that reduces slippage while the luggage 100 and luggage 900 are coupled together. Additionally, or alternatively, magnets or hook and loop fasteners (e.g., Velcro) may be placed on the rear portions 105 and 905 to assist in coupling luggage 100 and luggage 900 together.

Figure 11:
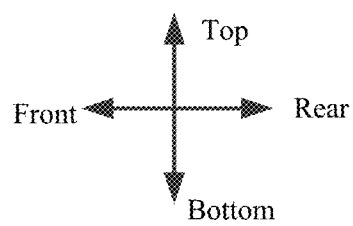
FIG. 11 is a diagram illustrating aspects of an example embodiment of luggage.
Figure 11:
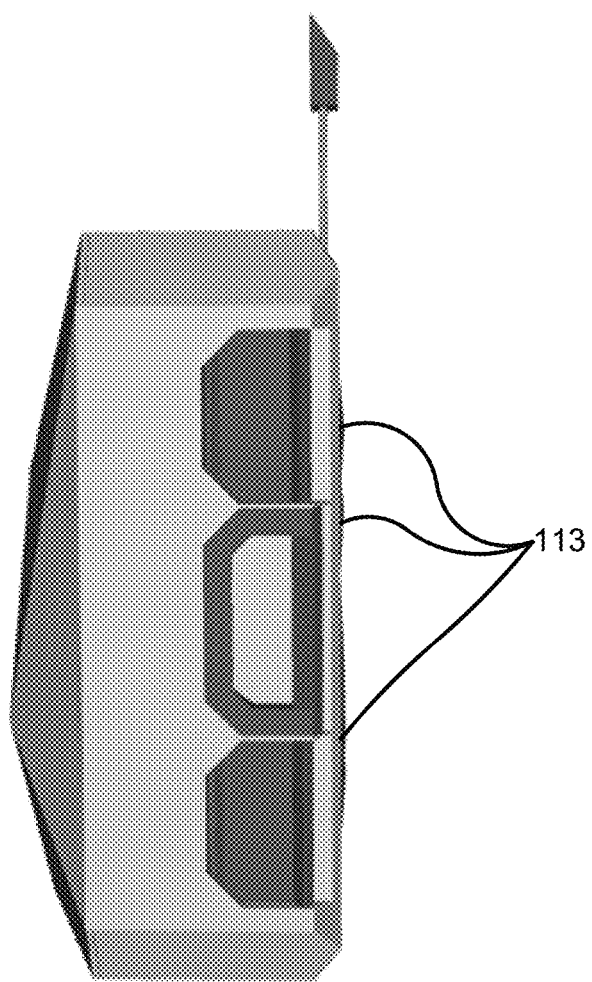

FIG. 11 illustrates another example side view of the luggage 100. From this view, it can be seen that the protrusions 113 may protrude from the rear portion 105 of the luggage 100. In other words, FIG. 11 illustrates that the protrusions 113 may protrude outward from the luggage 100 past a rear most edge of the side portion 105 of the luggage 100. In the example in FIG. 11, the protrusion is slight because in this example the protrusions 113 are at most 1 cm. In other embodiments, the protrusions 113 may be more or less pronounced.

Figure 12:
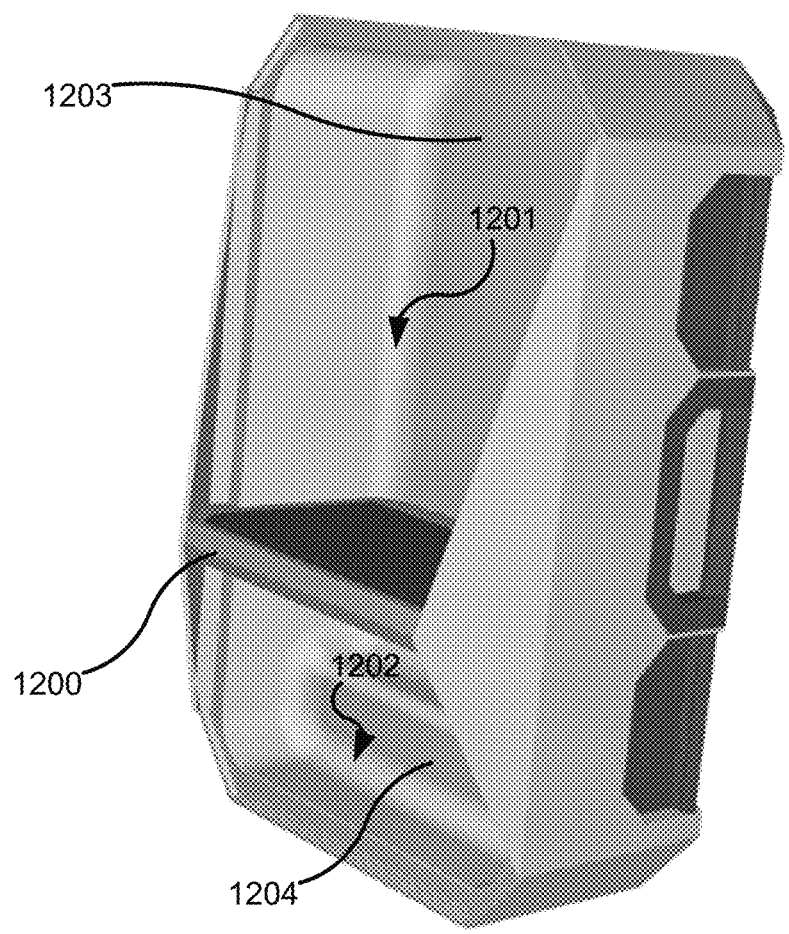
FIG. 12 is a diagram illustrating aspects of an example embodiment of luggage.

FIG. 12 illustrates another example perspective view of an interior of the luggage 100. As shown in the example of FIG. 12, a partition 1200 separates a first compartment 1201 and a second compartment 1202. In some embodiments, the partition may include a hinge that allows rotation of the upper and lower lids 401 and 402. The partition 1200 may also provide structural support for one or more of the front facets 104$x$, which as shown in FIG. 12 may be angled toward a middle of the luggage 100. In some embodiments, instead of a partition 1200, the luggage 100 may include only one or more cross beams for structural support and there may be only one compartment. Still, in other embodiments, the luggage 100 may include three or more compartments. Also, although the first compartment 1201 is shown as being larger than the second compartment 1202, the opposite may be true in other embodiments. And, in some embodiments, the first and second compartment may be equal in size and/or shape. Although not shown in FIG. 12, one or more straps, buckles, pouches, pockets, clips, etc. may be included on the interior of the luggage 100.

FIG. 12 also shows the back wall 1203 of the interior of the luggage 100. This back wall 1203 may protect the microcontroller, microprocessor, or other computing device of the luggage 100 from the contents in the interior of the luggage 100. In some embodiments, the back wall 1203 may be made from a hard material to protect the computing device from relatively heavy items in the interior. The back wall 1203 may be made from a material that will not bend (or will only bend a little) when a heavy item is placed in the interior of the luggage 100. The back wall 1203 may also protect items in the interior from becoming lodged in the handle and wheel assembly of the luggage 100. In addition, the back wall 1203 may prevent people from accessing the interior of the luggage through the flap(s) 602 for the wheel(s) 114 and/or kickstand 115 of the luggage 100.

Still referring to FIG. 12, an example wheel well 1204 is also illustrated. The wheel well 1204 may be where the wheels 114 (or part of the wheels 114) are stowed when they are not deployed. The wheel well 1204 may also accommodate the weighing mechanism (e.g., top and bottom plates with load cell(s) therebetween) described herein. In some examples, a different wheel well may be provided for each wheel. In some embodiments, the size of the wheel well 1204 may be larger or smaller. Moreover, in some embodiments in which the wheels 114 are particularly small, the wheel well 1204 might not protrude into the second compartment 1202.

Figure 13:
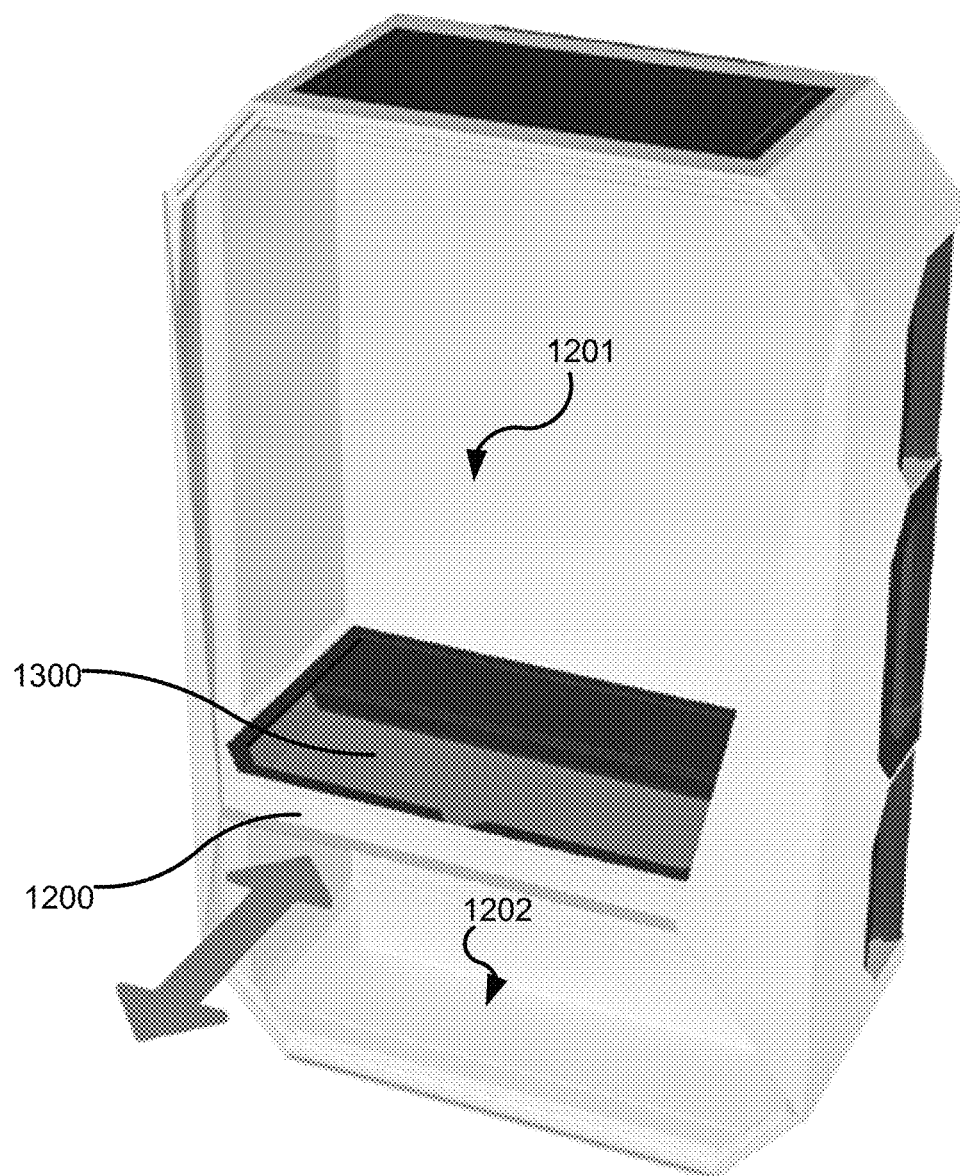
FIG. 13 is a diagram illustrating aspects of an example embodiment of luggage.

FIG. 13 illustrates yet another example perspective view of an interior of the luggage 100. As shown in FIG. 13, the partition 1200 may include a third compartment 1300. In some embodiments, the third compartment 1300 may be hidden by a cover 1301. The cover 1301 may be configured so that it appears to be merely a wall in order to keep the existence of the third compartment 1300 a secret. In other words, the third compartment 1300 may be a secret compartment within the partition 1200. The cover 1301 may be opened by, for example, sliding the cover 1301 towards the front, rear, or sides. In some cases, the cover 1301 may have a lip that allows the user to grab the cover 1301 to slide it. In some embodiments, the cover 1301 may have to be pushed down before it can be slid aside. Also, in some embodiments, the cover 1301 may slide behind the back wall 1203 of the interior and into the rear compartment 405. Further in some embodiments, the cover 1301 may be locked and unlocked so as to permit and prevent, respectively, others from accessing the third compartment 1300. In some instances, a first type of authentication (e.g., iris scanning) may be used to restrict access to the interior of the luggage, and a second type of authentication (e.g., fingerprint reading) may be used to restrict access to the third compartment 1300. In some examples, the cover 1301 may include its own identification device that attempts to identify a person trying to access the third compartment 1300 (e.g., a fingerprint reader that scans a person's fingerprint when they attempt to slide the cover 1301 open).

The cover 1301 in the example of FIG. 13 is shown as a single panel or plate. However, other configurations of the cover 1301 may be implemented in other embodiments. For example, in some embodiments, the cover 1301 may be made of slats that are configured to roll up when the cover 1301 is pushed or pulled open. Alternatively, the cover 1301 may flip or rotate open about one or more hinges towards the rear of the opening of the third compartment 1300.

The size of the third compartment 1300 may vary in different embodiments. In some embodiments, the size of the third compartment 1300 may be approximately 1 cm-5 cm so that the third compartment may store important or valuable items, such as travel documents (e.g., a passport or license), money/currency, or keys, without taking up much room within the interior of the luggage 100.

Figure 14A:
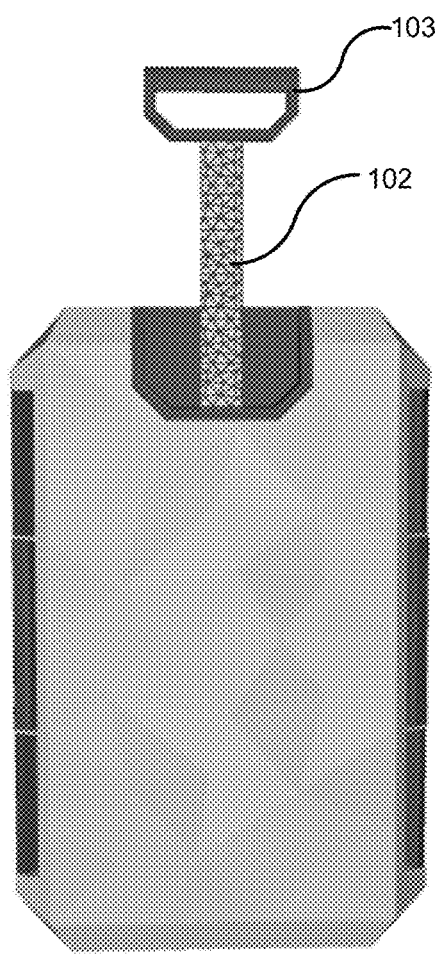
FIGS. 14A and 14B each illustrate aspects of an example embodiment of luggage.
Figure 14B:
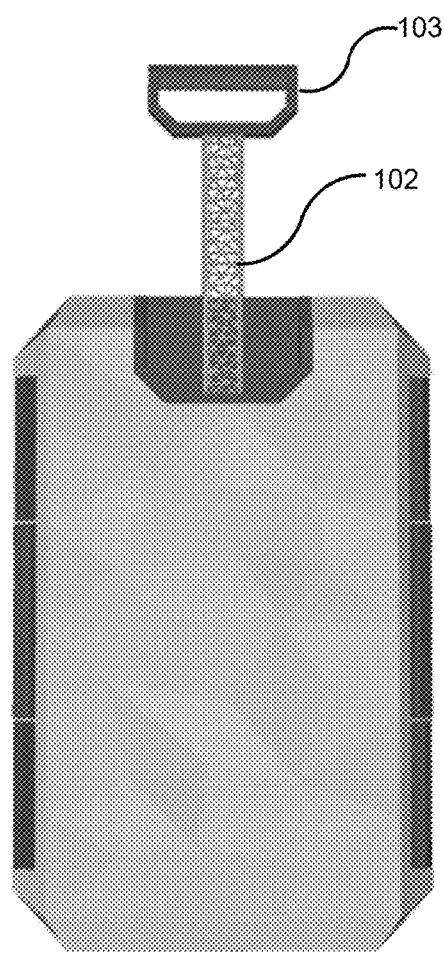

FIGS. 14A and 14B illustrate rear views of the luggage 100 having different stems 102. Various materials, such as wood, metal, plastic, carbon fiber, etc. may be used for the stems in FIGS. 14A and 14B. In some embodiments, the stems 102 in FIGS. 14A and 14B may be made of the same material as the body 101 of the luggage 100. In other embodiments, the stems may be made of different materials than the body 101 of the luggage 100.

In FIG. 14A, the stem 102 may be solid or have a solid exterior with a hollow interior. As shown in FIG. 14A, a pattern may be printed or adhered to the stem 102. The pattern in FIG. 14A is just one example pattern. Other embodiments may have a different pattern or no pattern.

As illustrated in the example of FIG. 14B, the stem 102 may be molded or carved out to have cut out portions or holes through portions of the stem 102. This may reduce the weight of the stem 102 and thus the overall weight of the luggage 100. Although many cut out portions may be made, the stem 102 should remain strong enough to allow the user to pull or push the luggage 100 using the top handle 103. The pattern of the carving/molding in FIG. 14B is just one example. Other embodiments may have a different pattern. For example, the cut out portions could appear as triangles, squares, hexagons, or other shapes. The number of cut out portions might also be different. The number of cut out portions might vary depending on the length of the stem 102, which also might vary in different embodiments.

Figure 15:
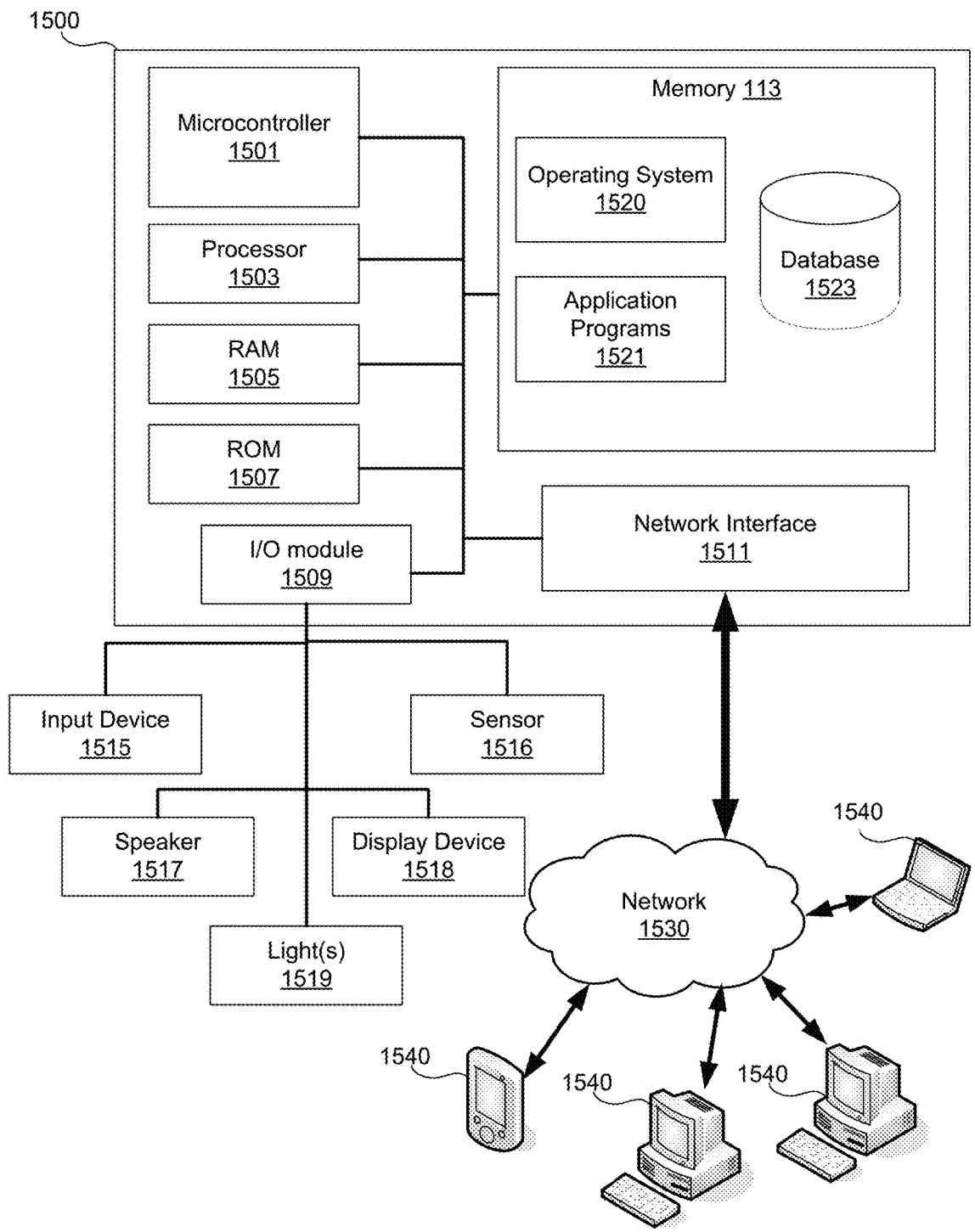
FIG. 15 is a block diagram of an example computing device that may be used according to an illustrative embodiment of the present disclosure.

FIG. 15 illustrates a block diagram of an example computing device 1500 that may be used according to an illustrative embodiment of the present disclosure. As described herein, the computing device 1500 may be located in the rear compartment 405. The computing device 1500 may be any hardware or circuitry configured to perform or execute the logic, algorithms, and processes described herein. The computing device 1500 may include a microcontroller 1501 for carrying out the logic, algorithms, and processes described herein. For example, the microcontroller 1501 may control an iris scanner to perform iris scanning to authenticate a user of the luggage 100. As another example, the microcontroller 1501 may control one or more locks to lock or unlock the upper and lower lids 401 and 402. The microcontroller 1501 may be implemented with one or more processors and one or more storage units (e.g., databases, RAM, ROM, and other computer-readable media), one or more application specific integrated circuits (ASICs), and/or other hardware components. Throughout this disclosure, the microcontroller 1501 may refer to the hardware and/or software used to implement a disclosed functionality.

The computing device 1500 may also include one or more processors 1503. The processor 1503 may be a microprocessor or any other processor for reading and writing data and executing instructions (e.g., computer-executable instructions or computer programs). The one or more processors 1503 may execute instructions of a luggage control program, which may be one of a suite of programs (including, e.g., a mobile device program and server program) used by a system in accordance with the concepts disclosed herein. The one or more processors 1503 may operate in addition to or in conjunction with the microcomputer 1501. The processor 1503 may be configured to control operations of the computing device 1500 and its associated components, including RAM 1505, ROM 1507, an input/output (I/O) module 1509, a network interface 1511, and memory 1513.

The I/O module 1509 may be configured to connect to an input device 1515, such as a microphone, keypad, keyboard, touchscreen, and/or stylus through which a user of the computing device 1500 may provide input data. The I/O module 1509 may also be configured to connect the microcontroller 1501 or processor 1503 to one or more sensors 1516 throughout the luggage 100. For example, the I/O module 1509 may be configured to connect the microcontroller 1501 or processor 1503 to a proximity sensor that detects coupling/uncoupling of the luggage 100 with another piece of luggage (e.g., luggage 900) or detects closing/opening of a lid (e.g., upper lid 401 or lower lid 402) or covers 1301 or 501 of the luggage 100. Other examples of sensors may include a GPS receiver that detects GPS coordinates of the luggage 100, a temperature sensor that detects a temperature of the environment surrounding the luggage 100, a scale that detects a weight of the luggage 100 and its contents (if any), pressure sensors, light sensors, heat sensors, gyroscopes, accelerometers, etc.

Further, the I/O module 1509 may connect the computing device 1500 to a speaker 1517 in order to output information audibly. For example, instructions to complete iris scanning or other identification/authentication processes may be provided via the speaker 1517. Such instructions and other information (e.g., a weight of the luggage 100) may also be outputted visually. The I/O module 1509 may connect the computing device to a display device 1518, such as a monitor, touchscreen, LCD screen, LED screen, plasma screen, etc., and may include a graphics card. The I/O module 1509 may also connect the computing device 1500 to one or more lights 1519. The lights 1519 may be mounted on the inside or outside of the luggage 100. The lights 1519 may turn on when the luggage 100 is unlocked or locked. Additionally, or alternatively, the lights 1519 may turn on when the luggage 100 is opened (e.g., when the upper lid 401 or lower lid 402 is opened) so that a user may easily see the inside contents of the luggage. The lights 1519, display device 1518, speaker 517, sensor 516, and input device 1515 are shown as separate elements from the computing device 1500 because they may be at different locations on or in the luggage 100; however, they may be within the same structure (e.g., same structure that houses the microcontroller 1501 or processor 1503) in some cases.

The memory 1513 may be any computer readable medium for storing computer executable instructions (e.g., software, computer programs, algorithms, etc.). The memory 1513 may store software for an operating system 1520 (e.g., iOS, ANDROID, WINDOWS, etc.) and off-the-shelf application programs (e.g., MICROSOFT WORD) and/or proprietary computer programs (such as the luggage control program disclosed herein) 1521. The memory 1513 may also include one or more databases 1523. The instructions stored within memory 1513 may enable the computing device 1500 to perform various functions.

The network interface 1511 may allow the computing device 1500 to connect to and communicate with a network 1530. The network 1530 may be any type of network, including a local area network (LAN) and/or a wide area network (WAN). For example, the network may include one or more of a variety of networks, such as the Internet, a wireless local area network (WLAN), a cellular network, satellite network, or public switched telephone network. Through the network 1530, the computing device 1500 may communicate with one or more other computing devices 1540, such as laptops, notebooks, smartphones, personal computers, servers, etc. These other computing devices 1540 may also be configured in a similar manner as computing device 1500. In some embodiments the computing device 1500 may be connected to the computing devices 1540 to form a "cloud" computing environment.

The network interface 1511 may connect to the network 1530 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface 1511 may include a modem. Further, the network interface 1511 may use various protocols, including WiFi, Bluetooth, TCP/IP, Ethernet, File Transfer Protocol (FTP), Hypertext Transfer Protocol (HTTP), etc., to communicate with other computing devices 1540. In some embodiments, the computing device 1500 may include multiple network interfaces 1511 for communicating using different protocols or standards or over different networks.

Via the network interface 1511, the computing device 1500 may communicate with a mobile device of a user of the luggage 100. For example, the network interface 1511 may pass data during a WiFi direct or NFC communication session between the computing device 1500 within the luggage 100 and the luggage user's mobile device. As another example, the network interface 1511 may pass data through the Internet between the computing device 1500 within the luggage 100 to a server so that the computing device 1500 may receive flight information or share GPS coordinates of the luggage. In yet another example, the network interface 1511 may facilitate transmission of GPS coordinates through a satellite network to a server, so that users may track their luggage 100.

FIG. 15 is an example embodiment of a computing device 1500. In some embodiments, the computing device 1500 may include additional components, such as a battery (e.g., carbon battery, lithium polymer battery, etc.), power converter, and/or antennas. The computing device 1500 may also include multiple components of the same type. For example, the computing device 1500 may include multiple microcontrollers 1501. Any of the components of the computing device 1500 may communicate with any of the other components of the computing device 1500 via a data bus or other communication link. Also, in various embodiments, various combinations of the components of the computing device 1500 may be implemented. For example, in some embodiments, the computing device 1500 may have a microcontroller 1501, but not a processor 1503. Vice versa, the computing device 1500 may have a processor 1503, but not a microcontroller 1501.

Figure 16:
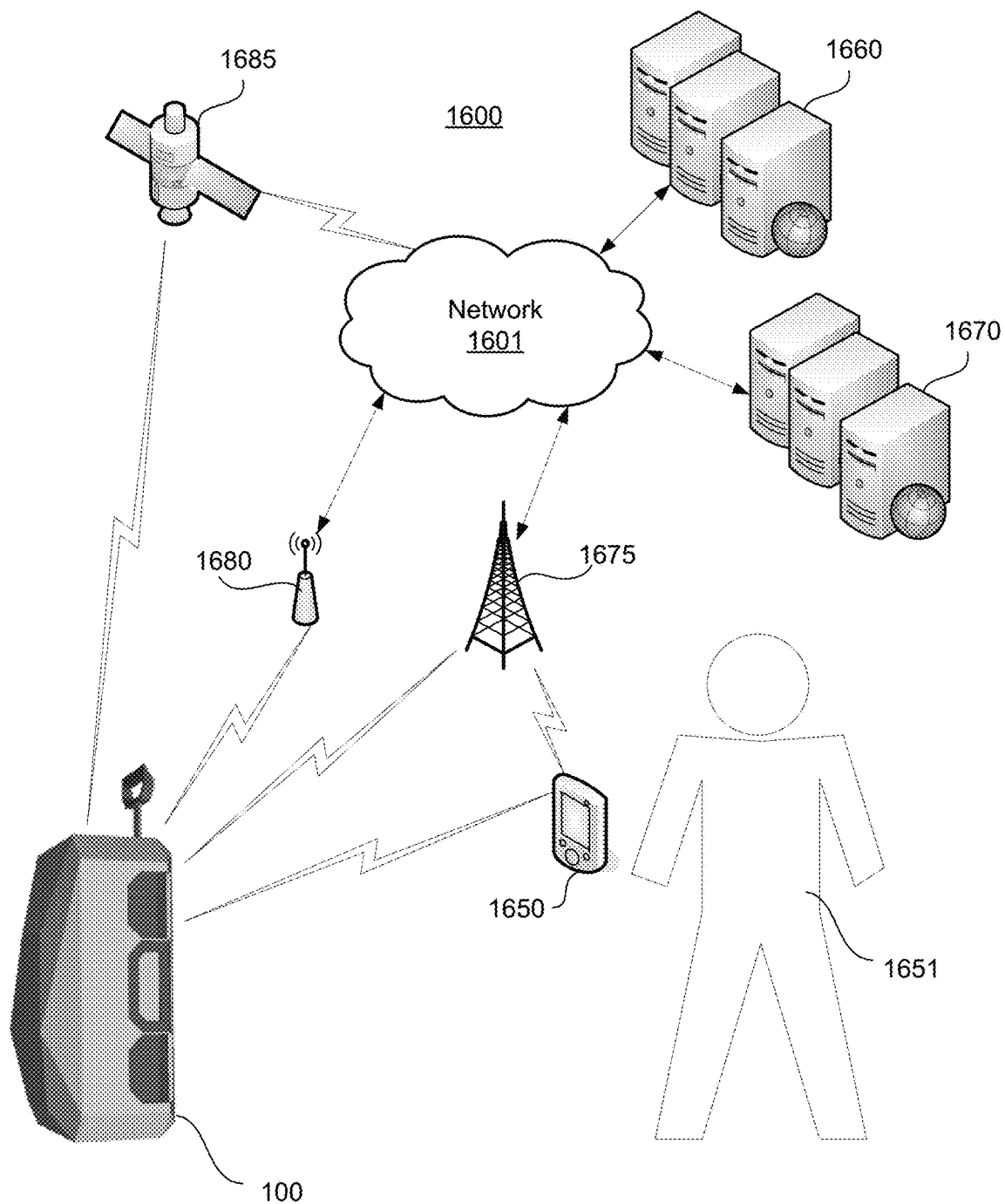
FIG. 16 illustrates an example environment in which a system in accordance with the present disclosure may be implemented.

FIG. 16 illustrates an example environment 1600 in which the luggage 100 may be used. As shown in FIG. 2, the environment 1600 may include a network 1601 configured to connect various computing devices, including the luggage 100, a mobile device 1650 (e.g., smartphone, tablet, PDA, etc.) of a user 1651, one or more luggage management servers 1660, and one or more third party servers 1670. Collectively, these computing devices may form a luggage management system. The network 1601 may be any type of network, like the network 1530 described above, and use one or more communication protocols (e.g., protocols for the Internet (IP), Bluetooth, cellular communications, satellite communications, etc.) to connect computing devices and servers within the environment 1600 so they may send and receive communications between each other.

FIG. 16 illustrates that the luggage 100 may communicate via a wired and/or wireless link with the mobile device 1650, which may in turn communicate via a cellular backhaul (including one or more cell towers 1675) with the luggage management servers 1660 and/or third party servers 1670. Additionally, or alternatively, the luggage 100 may communicate directly with the cellular backhaul. The luggage 100 may also communicate with the luggage management servers 1660 and/or third party servers 1670 via an access point 1680 (e.g., a wireless access point) using a wired and/or wireless connection. For example, the luggage 100 may retrieve data from a third party server 1670 via a WiFi connection between the luggage 100 and the access point 1680.

Further, the luggage 100 may be equipped with a transceiver for communicating with a satellite 1685 of a satellite network. For example, the luggage 100 may have a GPS transceiver for tracking the luggage 100. The luggage 100 may also obtain information (e.g., time, time zone, etc.) via the connection with the satellite 1685.

The luggage management servers 1660 may be configured to store or provide various information. For example, the luggage management servers 1660 may store or provide user customizable settings for customizing interfaces displayed on the mobile device 1650 or luggage 100, tracking information for tracking the luggage 100, user information (e.g., contact information, such as a user email address or telephone number) regarding the user 1651 of the mobile device 1650 or luggage 100, and luggage identification information (e.g., a serial number associated with a particular piece of luggage 100). In some embodiments, the luggage management servers 1660 may store biometric information or other identification information (e.g., a PIN, password, voice recognition data, etc.) of the user 1651 so that this information may be protected in case a person steals the luggage 100. In some embodiments, where sensitive information (e.g., biometric information) is stored locally on the luggage 100, the luggage 100 may be configured to wipe such sensitive information from local memory of the luggage 100 in the event that luggage 100 is stolen or misplaced.

Additionally, or alternatively, the luggage management servers 1660 may include information on airplanes and flights. For example, a luggage management server 1660 may store (or have access to) information specifying what type of plane (e.g., BOEING 737, BOEING 747, BOEING 777, AIRBUS A380, etc.) is used for a particular flight and how large the overhead bin is on the plane used for the particular flight. Additionally, or alternatively, a luggage management server 1660 may store (or have access to) information specifying the luggage restrictions of different airlines. Thus, the user 1651 of luggage 100 may access luggage restrictions using his/her mobile device 1650 or the computing device 1500 within the luggage 100.

The third party servers 1670 may include servers of third parties, such as airline operators, that provide various information that travelers may desire. As an example, the third party server 1670 may provide the luggage 100 with flight status information or options for checking in for a flight. Accordingly, travelers may receive an electronic boarding pass and/or electronic checked bag tag through the computing device 1500 within the luggage 100. As another example, a third party server 1670 may provide weather information of a destination of a traveler who is using the luggage 100.

Figure 17:
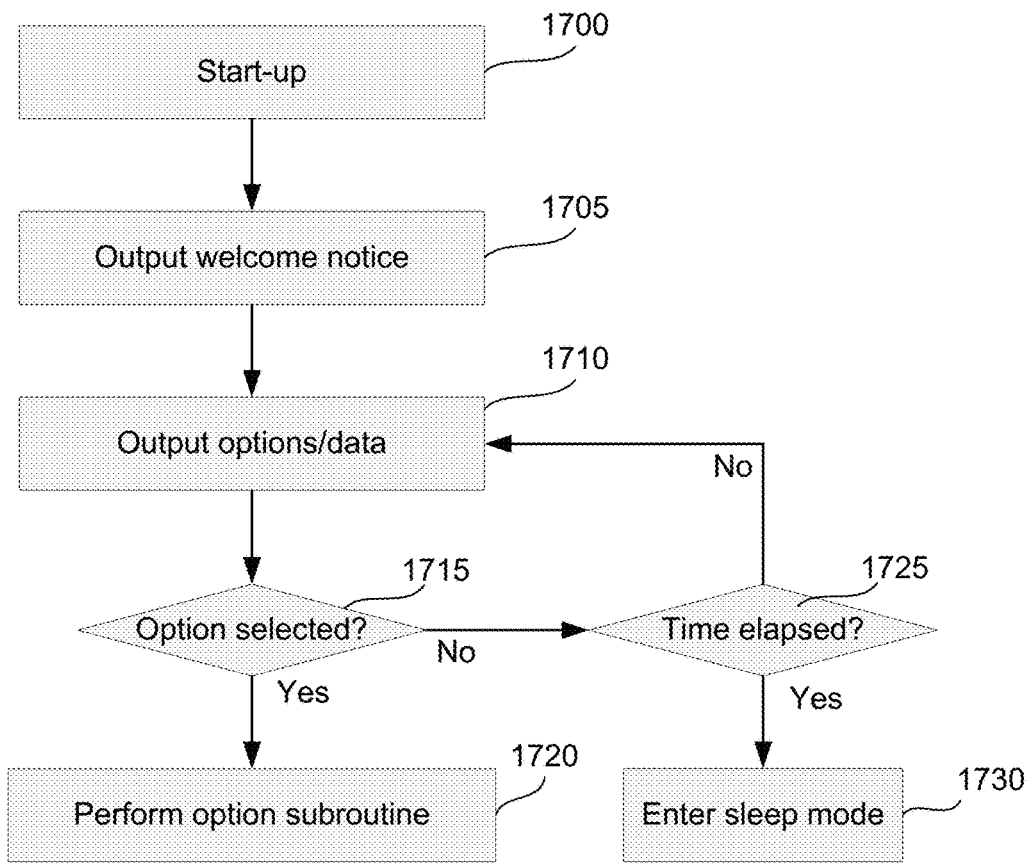
FIGS. 17-22 illustrate flow diagrams of example processes in accordance with aspects of the present disclosure.

FIG. 17 illustrates a flow diagram for an example method in accordance with aspects of the present disclosure. More specifically, FIG. 17 illustrates a plurality of steps that may be performed by the computing device 1500 of the luggage 100 or the mobile device 1650. One or more of the steps of FIG. 17 may be performed by executing a luggage control program or mobile device program.

In step 1700, a start-up operation may be performed. The start-up operation may be performed in response to, for example, opening of the cover 501 or pressing of a power button 503. The start-up operation may include initiating execution of (or launching) a luggage control program by the computing device 1500 of the luggage 100. The computing device may then output a welcome notice at step 1705. The welcome notice may be output by displaying a message or home screen on the screen 502. Additionally, or alternatively, a welcome notice may be output by playing an audible message through a speaker of the luggage 100. In some embodiments, the welcome notice may be an indication that the computing device 1500 of the luggage 100 is on and running properly. The welcome notice may also include instructions for opening the luggage 100 or performing other operations with respect to the luggage (e.g., deploying its wheels 114).

In step 1710, options and/or data may be output. For example, the computing device 1500 may cause a plurality of options for functions that a user can perform using the luggage 100 to be displayed on the screen 502. Additionally, or alternatively, the options may be output by playing an audible message through a speaker of the luggage 100. In some embodiments, the options may be displayed or otherwise output via the mobile device 1650. Examples of some options include opening the luggage 100, deploying wheels 114 of the luggage 100, determining a weight of the luggage 100, coupling the luggage 100 with another piece of luggage 900, checking in for a flight, getting flight status information, syncing the luggage 100 with the mobile device 1650, and turning off a power to the luggage 100. In addition, the luggage 100 may display, on its screen 502, data, such as a current location (e.g., city), current time and/or date, a current time zone, a temperature of an environment surrounding the luggage (e.g., a current ambient temperature), a temperature inside the luggage, and weather information (e.g., information indicating weather at a current location of the luggage or destination of travel). In some embodiments, step 1710 might not be performed until the user is authenticated (e.g., passes an iris scanning test).

In step 1715, the computing device 1500 may determine whether one of the options is selected. An option may be selected, for example, when a user presses a virtual button on the screen 502. If an option is selected, the computing device 1500 may execute a subroutine associated with the selected option at step 1720. For example, if the user opts to open the luggage, the computing device 1500 may execute a subroutine for iris scanning. If the option is selected using a mobile device 1650, then the computing device 1500 may receive an indication of the selection from the mobile device 1650 at step 1715.

If no option is selected, the method may proceed to step 1725. In step 1725, the computing device 1500 may determine whether a predetermined period of time has elapsed since the options and/or data were last output in step 1710. If the predetermined period of time has not elapsed, the method may return to step 1710 to continue to display the options/data or display additional or updated options/data. If the predetermined period of time has elapsed, the computing device 1500 may enter into a sleep mode at step 1730. In the sleep mode, the computing device 1500 may conserve power by turning off certain functions (e.g., turning off the screen 502) or performing certain functions less often (e.g., transmitting/receiving communications to/from a satellite less often).

Figure 18:
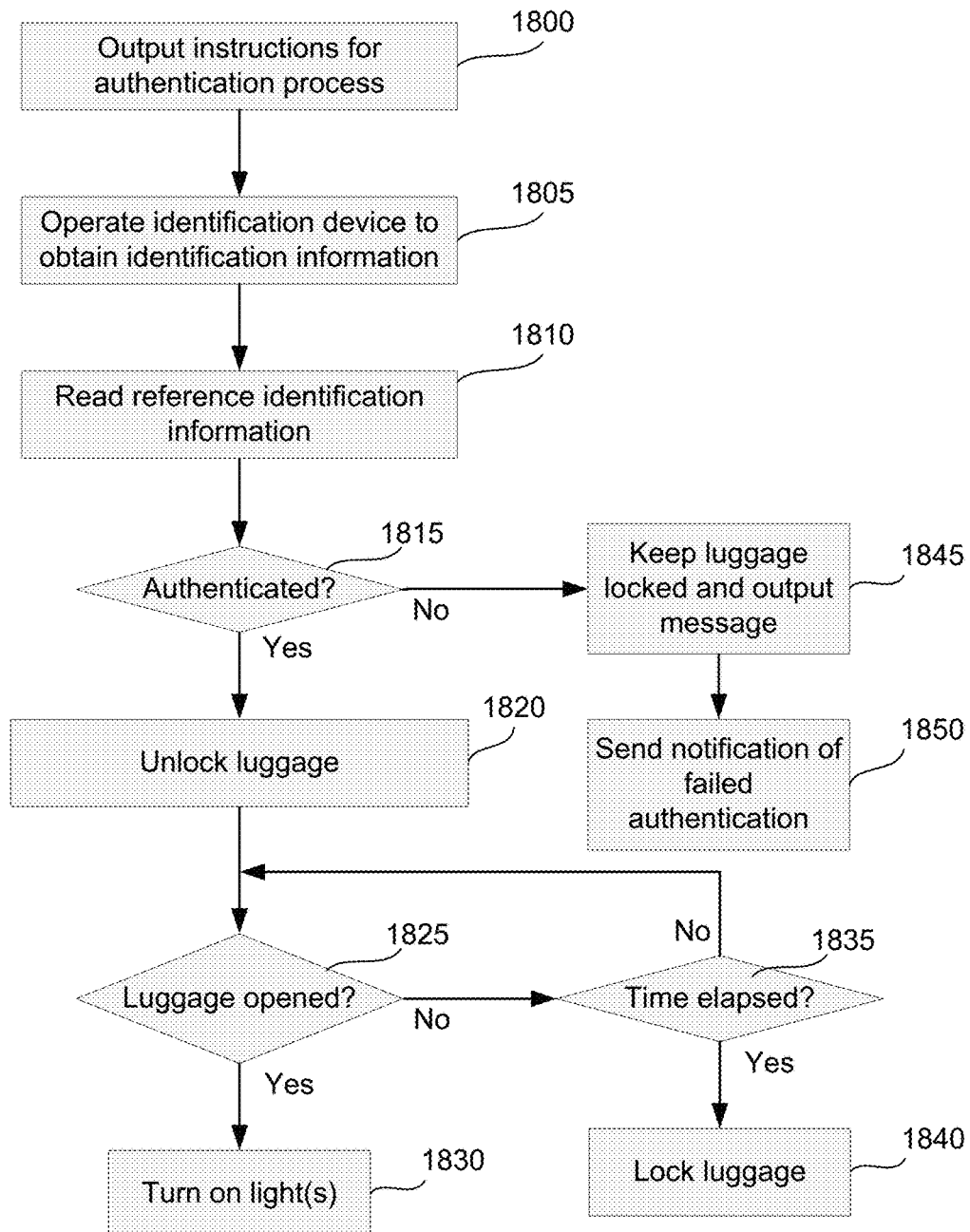

FIG. 18 illustrates a flow diagram for another example method in accordance with aspects of the present disclosure. More specifically, FIG. 18 illustrates a plurality of steps that may be performed by the computing device 1500 of the luggage 100, the identification device 504 of the luggage 100, or the mobile device 1650. One or more of the steps of FIG. 18 may be performed by executing a luggage control program, a server program, or a mobile device program. As a result of the method of FIG. 18, contents, if any, of the luggage 100 may be kept secured and out of the hands of unauthorized people.

The method of FIG. 18 may begin with step 1800 in which instructions for an authentication process are output. The instructions may indicate what type of authentication process is to be used to access the luggage 100. For example, the instructions may indicate that a user of the luggage 100 should activate an iris scanner or touch a fingerprint reader with a particular finger. The instructions may be output on a display, such as screen 502 or a display of the mobile device 1650 or through a speaker of the luggage 100 or the mobile device 1650.

In step 1805, an identification device, such as the identification device 504 on luggage 100 (or a similar identification device on the mobile device 1650 in sync (e.g., paired) with the luggage 100), may be operated to obtain identification information for a person (e.g., someone desiring to access/open the luggage 100). For example, an iris scanner on luggage 100 may operate to scan the iris of a person to obtain iris scan data in step 1805. The iris scanner may be controlled by the computing device 1500. The computing device 1500 may send a signal to activate the iris scanner and collect scan results from the iris scanner. As another example, a fingerprint reader on luggage 100 may read a person's fingerprint to obtain fingerprint data in step 1805. In yet another example, a person's fingerprint or eyes may be read or scanned using a camera of the mobile device 1650 (which is paired or synced with the luggage 100), and the luggage 100 may obtain the fingerprint or iris scan data from the mobile device 1650.

In step 1810, reference identification information may be read from memory. For example, the computing device 1500 of the luggage 100 may read, from local memory of the luggage 100 or remote memory in (or connected to) a luggage management server 1660, reference identification information. In some instances, the reference identification information may be stored remotely to protect it from theft in a case where the luggage 100 is stolen. The reference identification information may be previously acquired identification information that has been stored for use in future authentication processes. For example, when a user initially purchases the luggage 100, the user may perform a setup process in which the luggage 100 acquires reference identification information from the user so that only the user is permitted to access the luggage. In some embodiments, multiple users may be permitted to access the luggage 100 and therefore the reference identification information may include previously acquired identification information for the multiple users. For example, the luggage 100 may be setup so that both a husband and wife may be permitted to access the luggage 100. In such a case, the reference identification information may include, for example, iris scan data for both the husband and the wife or fingerprint data for both the husband and the wife.

In some cases, the reference identification information may be identification information associated with the user that last locked the luggage 100. It is contemplated that there may be multiple users of the luggage 100, and that one user might not want a previous user to have access to the luggage (e.g., a parent might not want his/her child to have access to the luggage). Thus, in some examples, the reference identification information that is read in step 1810 may correspond to the identification information that is acquired from a user when that user locked the luggage 100, so that only the user who locked the luggage is permitted to open it.

In step 1815, it is determined whether the user whose identification information is obtained in step 1805 is authenticated. This determination may be made by comparing the obtained identification information with the reference identification information. Various algorithms may be used for the comparison and the algorithms may be different for different types of identification data (e.g., one algorithm may be used for iris scan data whereas another algorithm may be used for fingerprint data). In some cases, image processing techniques, such as edge detection, image smoothing, image filtering, interpolation, etc., may be used prior to comparison. If the obtained identification information matches the reference identification information (either an identical match or within a predetermined margin of error), then the user is authenticated. Otherwise, the user is not authenticated. The determination (e.g., comparison) may be performed by the computing device 1500 within the luggage 100, by the mobile device 1650, or by the luggage management server 1660. In particular, in examples where the reference identification information is stored in the luggage management server 1660, the luggage management server 1660 may perform the determination in step 1815 in order to offload some of the processing responsibilities of the computing device 1500. In some examples, comparing the data may be computationally intensive, and therefore, it may be advantageous to do the comparison in the cloud (e.g., at the luggage management server 1660). In cases where the determination is made by the mobile device 1650 or luggage management server 1660, the mobile device 1650 or luggage management server may transmit a result of the determination to the computing device 1500 of the luggage 100.

If the user is authenticated (Yes at 1815), the luggage may be unlocked at step 1820. In some examples, step 1820 may include outputting a message or other indicator (e.g., flash a light, play a sound, etc.) indicating that authentication has been successful. In some embodiments, after being authenticated, the user may first have to select an option to unlock the luggage 100. Unlocking the luggage 100 may include the computing device 1500 electronically controlling one or more latches on the luggage 100 to release.

In some embodiments, unlocking the luggage 100 may cause a lid (e.g., upper lid 401) of the luggage 100 to open. In other embodiments, unlocking the luggage 100 does not necessarily cause a lid of the luggage 100 to open. In these other embodiments, the process may include a step 1825 in which the computing device 1500 determines whether the luggage 100 is opened. This determination may be based on sensor data obtained from one or more sensors (e.g., proximity sensors) that are configured to detect whether the luggage 100 is open or closed. Upon determining that the luggage is opened (Yes at step 1825), one or more lights may be turned on at step 1830. In some embodiments, the manual movement of a lid (e.g., upper lid 401 or lower lid 402) of the luggage 100 may trigger the light(s) to turn on without the computing device 1500 having to determine whether the luggage 100 has been opened and having to electronically control the light(s). For example, opening of a lid of the luggage 100 may cause a manual switch to flip thereby turning on one or more lights. One or more of these lights (e.g., LED lights) may direct light at a compartment 100 of the luggage to improve visibility of the compartment.

If the computing device 1500 determines that the luggage is not opened (No at step 1825), the process may proceed to step 1835 in which the computing device 1500 may determine whether a predetermined amount of time has elapsed since the luggage was unlocked at step 1820. If the predetermined amount of time has not elapsed, the process may return to step 1825. As such, the computing device 1500 may continuously or intermittently (e.g., periodically) determine whether the luggage 100 is opened. If the predetermined amount of time has elapsed before the luggage 100 is opened (Yes at 1835), the luggage 100 may be locked. For example, if two minutes pass by after the luggage 100 has been unlocked, the computing device 1500 may electronically control one or more latches to re-lock the luggage 100.

Returning to step 1815, if the user is not authenticated, the luggage may remain locked and the computing device 1500 may output a message or other indicator (e.g., vibration or buzz sound) indicating that authentication has failed at step 1845. In some embodiments, if authentication fails, an alarm (e.g., loud noise) may be sounded. This may deter those who are not permitted to access the luggage 100 from attempting to pass authentication in order to access the luggage 100.

In some embodiments, a notification of the failed authentication may be sent to one or more users at step 1850. This notification may serve to alert a user that someone else is attempting to access his/her luggage 100. The notification may be sent as an email, a text message (e.g., SMS), a phone call, or push notification (e.g., a notification to a mobile device program operating on the user's mobile device). For example, the computing device 1500 may transmit a text message via a cellular backhaul to a user's mobile phone informing the user that authentication failed. Alternatively, the computing device 1500 may communicate the authentication failure to a luggage management server 1660 which in turn may transmit a text message via the cellular backhaul to the user's mobile phone. The type of notification (e.g., email, text message, phone call, push notification, etc.) that is sent in step 1850 may depend on user customized settings (which may be stored in a profile (which may include the reference authentication information) that is stored locally in memory within the luggage or remotely at a luggage management server 1660).

In some embodiments, the computing device 1500 may generate a record or log of each successful and/or failed authentication. The computing device 1500 may store the record or log locally (e.g., in memory of the luggage 100) or remotely (e.g., at a luggage management server 1660). In some embodiments, the record or log may include the identification information that was provided by the user attempting to access the luggage 100 and/or a timestamp associated with the attempt. Accordingly, the record or log may be used to determine who attempted to impermissibly access the luggage 100. For example, information in the record of failed authentications could later be used to determine that an airline employee was trying to impermissibly access/open the luggage 100.

Figure 19:
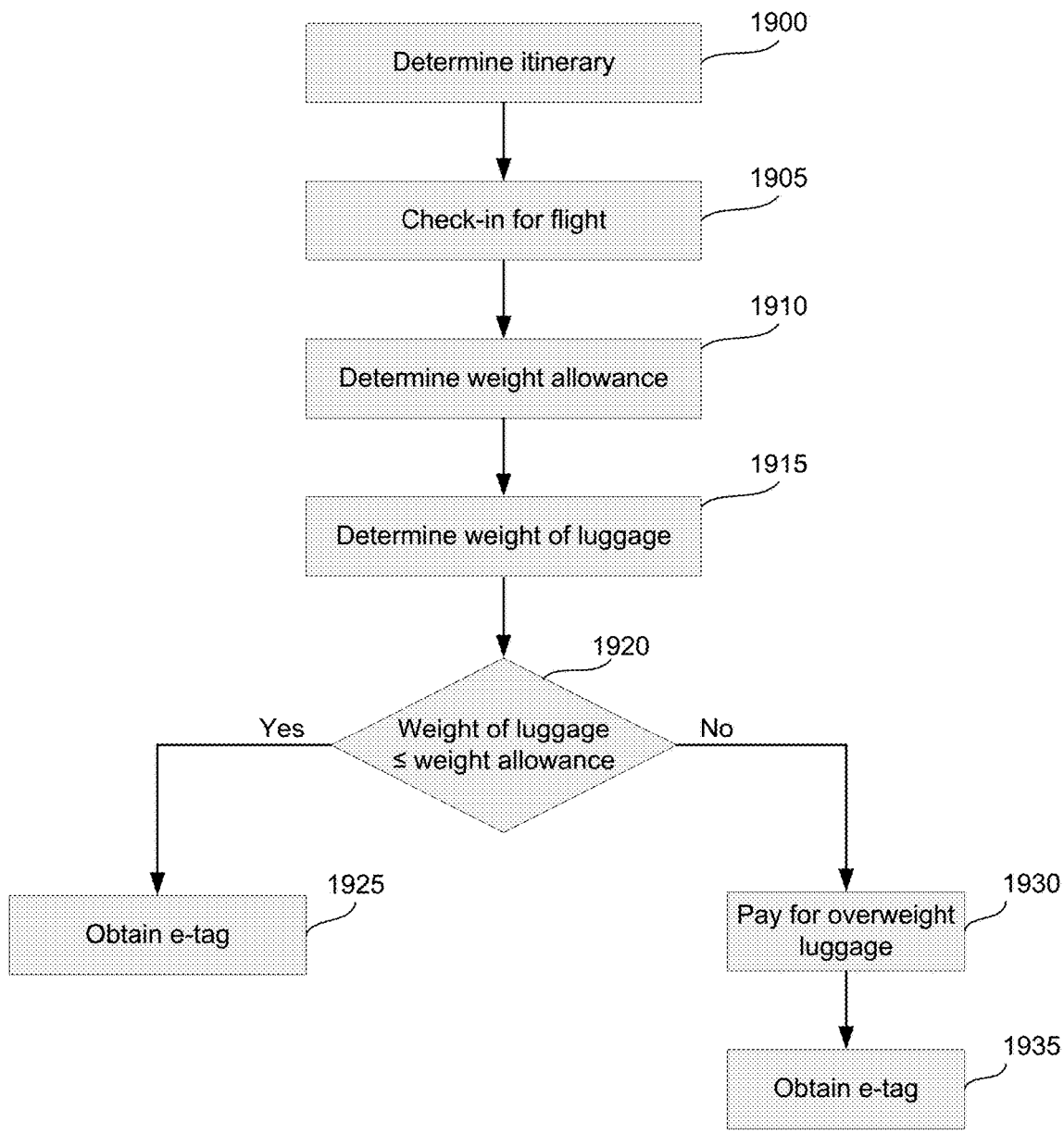

FIG. 19 illustrates a flow diagram for yet another example method in accordance with aspects of the present disclosure. More specifically, FIG. 19 illustrates a plurality of steps that may be performed by the computing device 1500 of the luggage 100, the identification device 504 of the luggage 100, or the mobile device 1650. One or more of the steps of FIG. 19 may be performed by executing a luggage control program, a server program, or a mobile device program. As a result of the method of FIG. 19, a user may ensure his/her luggage complies with luggage restrictions (e.g., TSA restrictions, airline restrictions, airplane restrictions, etc.) and/or conveniently arrange for his/her luggage 100 to be taken on a flight.

In some embodiments, the method of FIG. 19 may be a subroutine that is performed at step 1720 described above. Specifically, steps of FIG. 19 may be performed in response to selection of an option for designating an itinerary. The method of FIG. 19 may begin with a step 1900 of determining an itinerary of a user of the luggage 100. Determining the itinerary may include looking up a reservation (e.g., flight reservation) based on information supplied by a user. Examples of this user supplied information may include a reservation/confirmation number, a passenger name record (PNR), destination, credit card information, telephone number, social security number, etc. For example, in step 1900, via the screen 502, a user may select an airline providing the user's upcoming flight and may then enter a reservation code. The computing device 1500 may use this information to retrieve the user's itinerary. For example, the computing device 1500 may transmit the reservation code to a third party server 1670 of the airline to retrieve the user's itinerary.

After step 1900, the user may choose to check-in for the flight at step 1905. By checking-in, the user may indicate to the airline that he/she is still planning to take the flight. After the user checks-in or as part of the check-in process, a weight allowance for carry-on luggage may be determined at step 1910. For example, the computing device 1500 of the luggage 100 may determine what the weight allowance is on a particular upcoming flight on the user's itinerary. A weight allowance may refer to the maximum weight that a piece of carry-on luggage may weigh pursuant to certain guidelines, rules, or laws that apply to a flight. The weight allowance may depend on the airline and/or airplane associated with the flight. In some embodiments, weight allowances for many, if not all, flights, airlines, or airplanes may be stored by a luggage management server 1660, and the computing device 1500 may look-up the appropriate weight allowance by accessing the luggage management server 1660. The luggage management server 1660 may be updated intermittently (e.g., periodically) to store the most recent weight allowances.

In step 1915, the computing device 1500 may control one or more sensors to detect the weight of the luggage 100. The sensors may return the weight of the luggage 100 to the computing device 1500 or may return data that the computing device 1500 may use to determine the weight.

Then, after step 1915, the weight of the luggage may be compared with the weight allowance to determine whether the weight of the luggage 100 exceeds the weight allowance at step 1920. The determination at step 1920 may be performed by the computing device 1500, or the computing device 1500 may transmit the weight of the luggage to the mobile device 1650 or a luggage management server 1660, which may perform the determination.

If the weight of the luggage is less than or equal to the weight allowance (Yes at step 1920), the computing device 1500 may obtain an e-tag for the luggage 100 at step 1925. The e-tag may be evidence that the luggage 100 complies with the weight allowance. The e-tag may be submitted to a steward/stewardess as proof that the luggage 100 has been approved (e.g., meets the weight allowance). In some examples, the e-tag may be displayed on the screen 502 of the luggage 100 or the mobile device 1650 of a user of the luggage 100.

If the weight of the luggage is greater than the weight allowance (No at step 1920), the user may be prompted to pay the required/requested charge (or fee) for the overweight luggage. At step 1930, the user may complete the payment process to pay the fee for the overweight luggage using, for example, the screen 502 of the luggage. After completing the payment process at step 1930, the computing device 1500 may obtain an e-tag for the luggage 100 at step 1935. The e-tag may include an indication that the user has paid for the overweight luggage. This e-tag may also be displayed on the screen 502 of the luggage 100 or the mobile device 1650 of a user of the luggage 100.

Figure 20:
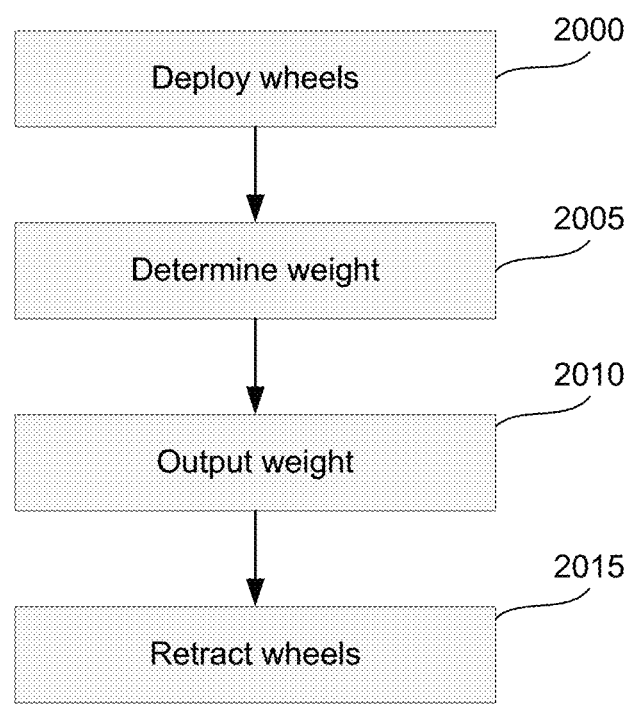

FIG. 20 illustrates a flow diagram for yet another example method in accordance with aspects of the present disclosure. One or more of the steps of FIG. 20 may be performed by the computing device 1500 of the luggage 100 or the mobile device 1650 executing a luggage control program or a mobile device program. As a result of the method of FIG. 20, a user may obtain the weight of his/her luggage.

In some embodiments, the method of FIG. 20 may be a subroutine that is performed at step 1720 described above. Specifically, steps of FIG. 20 may be performed in response to selection of an option for weighing the luggage 100. The method of FIG. 20 may begin with a step 2000 of deploying the wheels 114 of the luggage 100. The wheels 114 may be electronically deployed under control of the computing device 1500. Or, a user may pull the top handle 103 out of the "in" position to deploy the wheels 114. In some cases, when an option to weigh the luggage 100 is selected, the screen 502 may instruct the user to pull the top handle 103 out of the "in" position so that the weight may be obtained.

In step 2005, the weight of the luggage may be determined. The weight may be determined based on data received from one or more weighing mechanisms (e.g., weight sensors or scales) on the luggage 100. Each weighing mechanism may include two plates (e.g., a top plate and bottom plate) with one or more load cells or other sensors (e.g., a force or pressure sensor) therebetween. Specifically, one or more load cells may be placed between the top plate and bottom plate at a location between two wheels 114 fixed to an underside of the top plate. The one or more load cells may be fixed to the top plate or the bottom plate. When the gap between the two plates is reduced (e.g., when the top plate is pulled or pushed downward), the one or more load cells may be sandwiched by the two plates thereby applying pressure on the one or more load cells. The one or more load cells may detect this pressure and provide a reading that may be interpreted as the weight of the luggage 100 and its contents. The two plates may be flat plates that are approximately parallel to each other in a horizontal plane (front-rear-left-right plane). Also, the two plates may be positioned towards the bottom of the body 101 of the luggage 100.

In step 2010, the weight of the luggage 100 may be output. For example, the weight may be displayed on a screen 502 of the luggage 100 or output through a speaker of the luggage 100. Additionally, or alternatively, the weight may be transmitted from the luggage 100 to a mobile device 1650 and output via a screen or speaker of the mobile device 1650.

After the weight of the wheels is obtained, the wheels 114 may be retracted. That is, the wheels 114 may move back inside the body 101 of the luggage 100. This may be done automatically under electronic control of the computing device 1500 or as a result of a user pushing the top handle 103 back into the "in" position.

Figure 21:
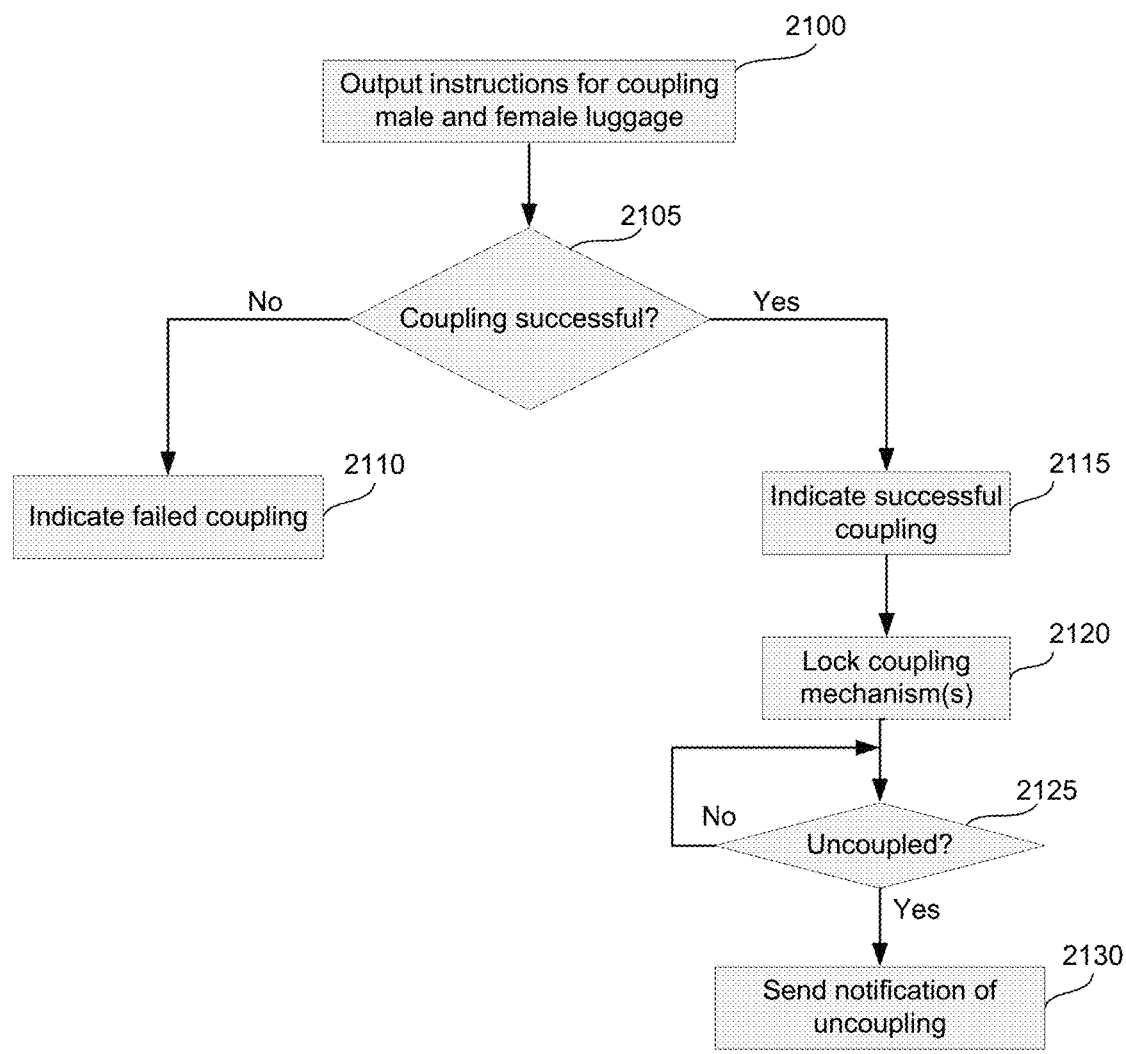

FIG. 21 illustrates a flow diagram for yet another example method in accordance with aspects of the present disclosure.

One or more of the steps of FIG. 21 may be performed by the computing device 1500 of the luggage 100 or the mobile device 1650 executing a luggage control program or a mobile device program. As a result of the method of FIG. 20, a user may couple two pieces of luggage, such as luggage 100 and luggage 900.

In some embodiments, the method of FIG. 21 may be a subroutine that is performed at step 1720 described above. Specifically, steps of FIG. 21 may be performed in response to selection of an option for coupling the luggage 100 to another piece of luggage. The method of FIG. 21 may begin with a step 2100 of outputting instructions for coupling two pieces of luggage together. The instructions may inform a user how to operate the coupling mechanism(s) of the luggage 100 (e.g., how to latch a coupler of one piece of luggage to a recess of another piece of luggage). In some embodiments, step 2100 may include releasing a latch, stopper, or other locking mechanism that prevents a coupling mechanism from moving. For example, step 2100 may include unlocking one or more couplers 110a, 110b, 111a, and/or 111b so that they may be rotated for coupling to another piece of luggage.

In step 2105, the computing device 1500 may determine whether coupling is successful. The computing device 1500 may receive data from one or more sensors, such as proximity sensors, on the luggage 100 and/or luggage 900 indicating whether the luggage 100 and luggage 900 are coupled together. Based on the data received from the one or more sensors, the computing device 1500 may determine whether the two pieces of luggage are properly coupled together. In some cases, if only one side is coupled, the computing device 1500 may determine that the coupling is not successful or proper.

If coupling is not successful, an indication of failed coupling may be output to the user at step 2110. For example, a message that coupling has failed or that the two pieces are still uncoupled may be displayed on the screen 502 or screen of a mobile device 1650. Other indicators, such as lights or sounds (e.g., beeps), may be used to indicate failed coupling in various embodiments.

If coupling is successful, an indication of successful coupling may be output to the user at step 2115. For example, a message that coupling has been successful or that the two pieces are coupled may be displayed on the screen 502 or screen of a mobile device 1650. Other indicators, such as lights or sounds (e.g., beeps), may be used to indicate successful coupling in various embodiments.

In some embodiments, after successful coupling is determined, the coupling mechanism(s) may be locked at step 2120. Locking the coupling mechanism(s) may help to keep the two pieces of luggage (e.g., luggage 100 and luggage 900) coupled together. In step 2120, the computing device 1500 of the luggage 100 or luggage 900 may electronically control a latch, hook, or other locking mechanism to lock the two pieces of luggage together in response to determining coupling has been successful.

In some embodiments, once two pieces of luggage are coupled together, they may remain coupled until an authenticated user chooses to uncouple them. In other words, the coupling mechanism(s) used to couple the two pieces of luggage may stay coupled (and may stay locked) until a user who is authenticated using the identification device 504 decides to uncouple them. Thus, two coupled pieces of luggage might not be permissibly uncoupled by anyone.

In step 2125, the computing device 1500 may determine if two coupled pieces of luggage become uncoupled. This determination may be made based on data from the one or more sensors (e.g., proximity sensors) that may be used to determine whether coupling is successful. For example, a Hall effect sensor may detect when a coupler 110a of luggage 100 moves away from a recess 910a of luggage 900. The computing device 1500 of luggage 100 and/or luggage 900 may receive data from the Hall effect sensor in response to this detection and determine that the luggage 100 and luggage 900 are uncoupled based on the received data. Step 2125 may be repeated continuously or intermittently (e.g., periodically) until the two pieces of luggage become uncoupled.

If the two pieces become uncoupled, a notification may be sent indicating that the two pieces of luggage are uncoupled in step 2130. In some cases, the notification might only be sent if the uncoupling is unauthorized. In some embodiments, the notification may be sent to the user of luggage 100 and user of luggage 900. This notification may serve to alert a user that someone or something else has impermissibly uncoupled the luggage. The notification may be sent as an email, a text message (e.g., SMS), a phone call, or push notification (e.g., a notification to a mobile device program operating on the user's mobile device). For example, the computing device 1500 may transmit a text message via a cellular backhaul to a user's mobile phone informing the user that the two pieces of luggage have been uncoupled. Alternatively, the computing device 1500 may communicate the uncoupling detection to a luggage management server 1660 which in turn may transmit a text message via the cellular backhaul to the user's mobile phone 1650. The type of notification (e.g., email, text message, phone call, push notification, etc.) that is sent in step 2130 may depend on user customized settings (which may be stored in a profile that is stored locally in memory within the luggage or remotely at a luggage management server 1660).

Figure 22:
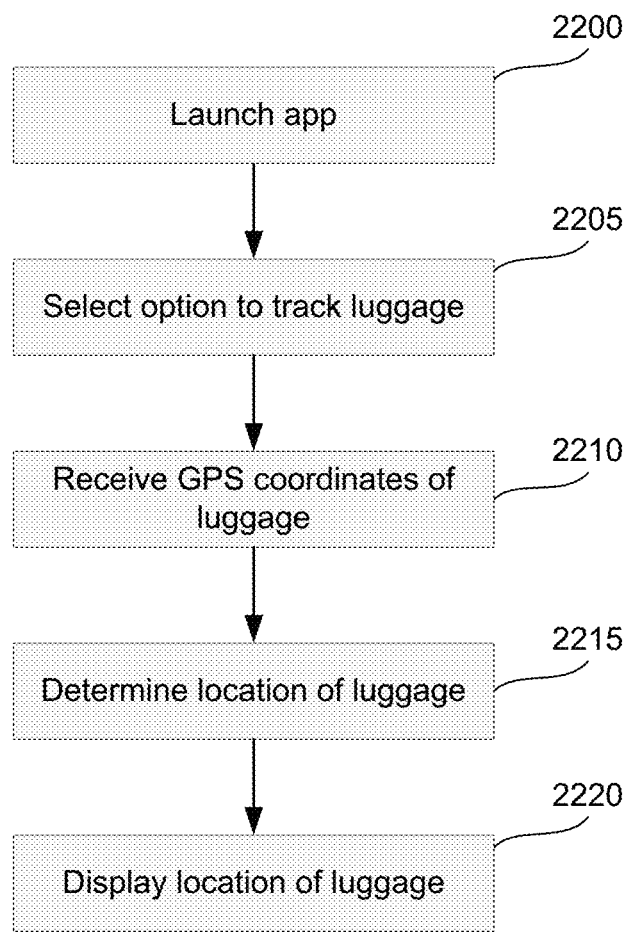

FIG. 22 illustrates a flow diagram for yet another example method in accordance with aspects of the present disclosure. One or more of the steps of FIG. 22 may be performed by the computing device 1500 of the luggage 100, the mobile device 1650, or a luggage management server 1660 executing a luggage control program, a mobile device program, or a server program, respectively. As a result of the method of FIG. 22, a user may track the location of his/her luggage. This method may also help a user recover the luggage 100 in case it becomes lost during travelling or stolen.

In step 2200, a user may launch an application, such as the mobile device program, on his/her mobile device 1650. The application may be an "app" designed specifically for mobile/portable devices running an ANDROID, iOS, Windows Mobile or other operating system. The "app" may be developed by the same entity that develops the luggage 100, and may be downloaded from a third party server 1670 providing an "app store," such as GOOGLE PLAY or iTUNES.

In step 2205, a user may select an option to track his/her luggage 100. The option may be a virtual button (which may be pressed or swiped by a user) on an interface provided by the application that was launched on the mobile device in step 2200.

In step 2210, the mobile device 1650 (e.g., the mobile device program) may receive GPS coordinates of the luggage 100. In some embodiments, step 2210 may include the mobile device 1650 pinging a GPS receiver in the luggage 100 through a satellite network to retrieve the GPS coordinates of the luggage 100. In some embodiments, step 2210 may include retrieving the GPS coordinates from a luggage management server 1660 that intermittently (e.g., periodically) receives GPS coordinates from the luggage 100 and stores the GPS coordinates (or most recent GPS coordinates) in case the mobile device requests them.

In step 2215, the location of the luggage 100 may be determined. This determination may include mapping the GPS coordinates to a map. The mapping may be performed by the mobile device 1650 or a luggage management server 1660. The map may include information that defines boundaries of countries, states, provinces, or cities and/or includes postal addresses. Therefore, for example, the GPS coordinates may be mapped to a particular city. In some embodiments, the mapping may include identifying a specific point on the map based on the GPS coordinates. Moreover, in some embodiments, step 2215 may include generating a marked up (or annotated) map showing a marker (e.g., a pin) on a graphical illustration of the map at the location of the luggage 100. The map used in step 2215 may be a proprietary map of an entity managing (or operating or controlling) the luggage management servers 1660 or may be a map provided by a third party, such as GOOGLE MAPS.

In step 2220, the location of the luggage may be displayed. For example, a map with a marker showing the location of the luggage 100 may be displayed on a screen of the mobile device 1650. Additionally, or alternatively, the country, state, province, city, etc. in which the luggage 100 is located may be displayed on the mobile device.

Figure 23:
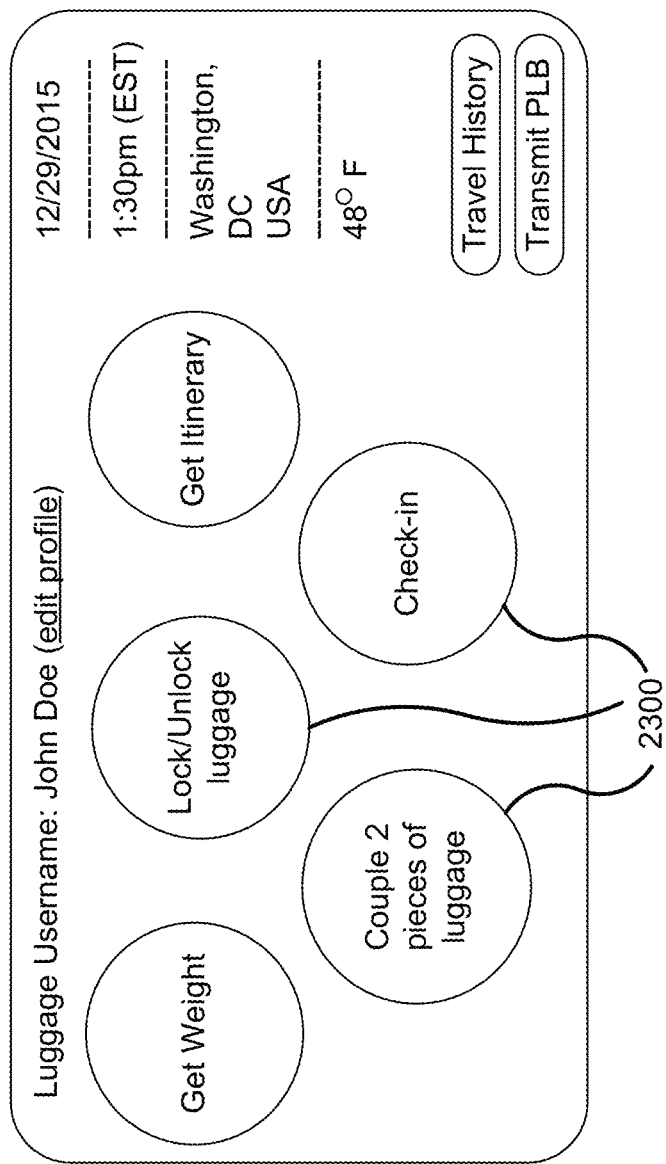
FIG. 23 illustrates an example interface that may be presented by a computing device configured according to aspects of the present disclosure.

FIG. 23 illustrates an example user interface in accordance with aspects of the present disclosure. The user interface in FIG. 23 may be displayed on the screen 502 of the luggage 100 or a screen of the mobile device 1650. As shown in FIG. 23, the user interface may include a plurality of options 2300. It should be understood that the appearance of the user interface is just one example appearance used to illustrate a few aspects of this disclosure and that many other user interfaces may be used in accordance with aspects of this disclosure. For example, the options 2300 may be different or appear different in different user interfaces.

Referring to FIG. 23, one of the options 2300 may allow a user to check-in to a flight using the computing device 1500 on the luggage 100. The computing device 1500 may communicate, via the Internet, with a third party server 1670 of an airline to complete a check-in process. Accordingly, the user of luggage 100 may avoid waiting in line at the airport to check in for a flight.

After successfully completing a check-in process, the computing device may receive an electronic boarding pass for a flight. The electronic boarding pass may include data (e.g., a bar code) that allows a user to board an aircraft. The computing device 1500 may display the electronic boarding pass on a screen on the luggage 100 so that the user of the luggage may present the electronic boarding pass to an agent at a gate for boarding a plane.

Still referring to FIG. 23, the interface may include an option that allows a user to edit a profile. Each user of the luggage 100 may have their own profile. Different embodiments may have different settings that may be customized within a profile. An example of a setting may include a setting for notifying the user of a distance that the user is from the luggage 100. In some embodiments, when the user moves within 30 feet of the luggage 100, an alarm may be sounded (e.g., by the user's mobile device or luggage 100). This may help users locate their luggage, for example, in a baggage claim area. In some embodiments, when the user moves outside of 20 feet of the luggage, an alarm may be sounded (e.g., by the user's mobile device or luggage 100). This may help users avoid forgetting their luggage 100 or losing their luggage 100. In some examples, the alarm may automatically turn off when the user is within 5 feet of the luggage 100. The distances may be determined from the GPS coordinates of the luggage 100 and GPS coordinates of the mobile device 1650 of the user (it may be assumed that the GPS coordinates of the mobile device 1650 represent the location of the user as user's often keep their mobile devices on them). Any of these distances may be different. Also, any of these distances may be set by a user by editing a profile associated with the user. It should be understood that these distances are just some examples of the settings that may be customized by a user by editing a profile.

FIG. 23 also illustrates an option that allows a user to view their travel history. The travel history may include how many air miles have been traveled as calculated by the computing device 1500 based on GPS coordinate data and/or other data (e.g., odometer readings, accelerometer readings, etc.). The travel history may be broken down to show how many miles were traveled on a particular trip or within a period of time (e.g., last week, last month, etc.). In some embodiments, the travel history may include a map plotting the locations of the luggage 100, and thus, may include a plot of places visited during the trips of the user(s) of the luggage 100. In some examples, the points plotted may be time stamped so that users may see how long they spent in different places. The travel history may also include a list of countries or cities visited and the duration spent in each country or city.

FIG. 23 further illustrates an option for transmitting a personal location beacon (PLB). Selecting this option (e.g., selecting the corresponding virtual button) may cause the luggage 100 (in particular, the computing device 1500 therein) to transmit a PLB. The PLB may be a signal that indicates the location of the luggage 100. If a user gets into trouble (e.g., becomes lost/stranded/kidnapped) while traveling, the user may select an option to transmit a PLB to notify emergency responders of the user's location. In some cases, the PLB may include the GPS coordinates of the luggage 100 as obtained by the GPS receiver on the luggage 100. Additionally, or alternatively, the PLB may include information identifying the luggage 100 (e.g., a serial number of the luggage). Each piece of luggage 100 may have a unique serial number (which may be an alphanumeric number) or other unique identifier.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention. For example, step 1810 may be performed prior to step 1805, such that the reference identification information may be read from memory prior to obtaining identification information from a current user of the luggage. As another example, step 1915 may be performed prior to 1910, such that the weight of the luggage 100 may be determined prior to determining the weight allowance.

What is claimed is:
1. Luggage, comprising:
   a body portion comprising a compartment for holding one or more items and a lid that moves between an open position and a closed position and encloses the compartment when the lid is in the closed position;
   a proximity sensor configured to detect when the lid is moved to the closed position;

an identification device configured to obtain biometric information of a user; and a computing device configured to:
receive, from the proximity sensor, information indicating that the lid is moved to the closed position;
control the identification device to obtain reference identification information;
electronically lock the lid in response to receiving the information indicating that the lid is moved to the closed position and in response to obtaining the reference identification information;
compare the biometric information with the reference identification information to determine whether the user is authorized to access the compartment; and
electronically unlock the lid in response to a determination that the user is authorized to access the compartment.

2. The luggage of claim 1, further comprising:
memory storing the reference identification information, wherein the computing device is further configured to:
store the reference identification information in the memory; and
determine that the use is authorized to access the compartment if the user was the last person to lock the luggage.

3. The luggage of claim 1, wherein the computing device is further configured to:
transmit, via a network, the reference identification information for storage in a memory remote from the luggage.

4. The luggage of claim 1, further comprising a locking mechanism configured to lock the lid in response to an electrical signal transmitted by the computing device when the lid is in the closed position.

5. The luggage of claim 1, wherein the computing device is further configured to:
after electronically unlocking the lid, determine whether the lid remains in the closed position for a predetermined time since unlocking the lid; and
in response to determining that the lid remains in the closed position for the predetermined time, transmit an electrical signal to a locking mechanism to control the locking mechanism to re-lock the lid.

6. The luggage of claim 1, wherein the proximity sensor is positioned on an interior of the compartment and configured to detect a magnet on an interior of the lid when the lid is in the closed position.

7. The luggage of claim 1, wherein the identification device comprises an iris scanner.

8. The luggage of claim 1, further comprising:
a display device configured to output a screen generated by the computing device,
wherein the computing device is further configured to control the display device to display a notification indicating that the lid is locked after controlling a locking mechanism to lock the lid in the closed position.

9. The luggage of claim 1, further comprising:
a wireless communication interface configured to wirelessly transmit or receive information with a mobile device,
wherein the computing device is further configured to:
establish a communication session with the mobile device via the wireless communication interface when the mobile device is within a radio wave range of the luggage; and
transmit, to the mobile device during the communication session, a notification indicating that the lid is locked after controlling a locking mechanism to lock the lid in the closed position.

10. The luggage of claim 1, further comprising:
a temperature sensor configured to determine an ambient temperature associated with the luggage;
a global positioning system transceiver configured to receive and transmit satellite communications for determining a location of the luggage;
a weight sensor configured to determine a weight of the luggage including any items within the compartment; and
a light configured to turn on when the lid is opened.

11. The luggage of claim 1, further comprising:
a coupling mechanism configured to couple the luggage to a second luggage having a second compartment different from the compartment of the luggage;
wherein the coupling mechanism comprises at least one arm that rotates from a first position in which an end of the arm contacts the body portion of the luggage to a second position in which the end of the arm engages a recessed portion of the second luggage.

12. The luggage of claim 11, wherein computing device is further configured to:
determine whether the second luggage is coupled to the luggage based on data received from a sensor; and
determine whether the coupling mechanism is locked such that the second luggage is locked to the luggage.

13. The luggage of claim 12, wherein computing device is further configured to:
electronically control a lock to lock the coupling mechanism; and
electronically control the lock to unlock the coupling mechanism in response to a determination that the user is authorized to detach the second luggage from the luggage.

14. A suitcase, comprising:
a shell forming a compartment for holding one or more items;
a lid configured to move between an open position and a closed position, wherein the lid exposes the compartment to a user outside of the shell when the lid is in the open position;
an identification device configured to collect biometric information of a first user;
memory storing reference identification information associated with a second user;
a proximity sensor configured to detect when the lid is moved to the closed position;
a computing device configured to:
receive, from the proximity sensor, information indicating that the lid is moved to the closed position;
control the identification device to obtain the reference identification information;
electronically lock the lid in response to receiving the information indicating that the lid is moved to the closed position and in response to obtaining the reference identification information;
compare the biometric information with the reference identification information to determine whether the first user matches the second user; and
electronically unlock the lid in response to determining that the first user matches the second user.

15. Luggage, comprising:

a body portion comprising a compartment for holding one or more items and a lid for enclosing the compartment when the lid is in a closed position;

an identification device configured to obtain identification information from a user;

a proximity sensor configured to detect when the lid is moved to the closed position;

a locking mechanism configured to lock the lid in the closed position; and a computing device configured to:
- receive, from the proximity sensor, information indicating that the lid is moved to the closed position;
- control the identification device to obtain first identification information from a first user;
- electronically control the locking mechanism to lock the lid in the closed position in response to obtaining the first identification information from the first user and in response to receiving the information indicating that the lid is moved to the closed position;
- electronically control the identification device to obtain second identification information from a second user;
- compare the second identification information with the first identification information to determine whether the first identification information matches the second identification information; and
- electronically control the locking mechanism to unlock the lid in response to a determination that the first identification information matches the second identification information.

16. The luggage of claim 15, further comprising:

a first coupler on a right side of the luggage configured to connect to a left side of a second luggage;

a second coupler on a left side of the luggage configured to connect to a right side of the second luggage; and one or more protrusions on a rear side of the luggage configured to engage one or more respective holes on a rear side of the second luggage.

17. The luggage of claim 16, further comprising:

a second locking mechanism configured to lock at least one of the first coupler or the second coupler when the luggage is coupled to the second luggage, wherein the computing device is further configured to:
- electronically control the second locking mechanism to lock the at least one of the first coupler or the second coupler in response to obtaining the first identification information from the first user;
- determine whether the second luggage becomes uncoupled from the luggage; and
- in response to a determination that the second luggage becomes uncoupled from the luggage, transmit, to a mobile device associated with the first user, a notification that the second luggage has been uncoupled from the luggage.

* * * * *